US010281607B2

(12) United States Patent
Hori et al.

(10) Patent No.: US 10,281,607 B2
(45) Date of Patent: May 7, 2019

(54) DOWNHOLE CALIPER USING MULTIPLE ACOUSTIC TRANSDUCERS

(71) Applicant: Schlumberger Technology Corporation, Sugar Land, TX (US)

(72) Inventors: Hiroshi Hori, Sagamira (JP); Yoshino Matsumoto, Kawasaki (JP); Kojiro Nishimiya, Yokohama (JP); Kiyomitsu Hikida, Yokohama (JP); Jean-Christophe Auchere, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 91 days.

(21) Appl. No.: 15/334,286

(22) Filed: Oct. 26, 2016

(65) Prior Publication Data

US 2017/0115423 A1    Apr. 27, 2017

Related U.S. Application Data

(60) Provisional application No. 62/246,549, filed on Oct. 26, 2015.

(51) Int. Cl.
*G01V 1/50* (2006.01)
(52) U.S. Cl.
CPC ...................................... *G01V 1/50* (2013.01)
(58) Field of Classification Search
CPC .................................. G01V 1/306; G01V 1/50
See application file for complete search history.

(56) References Cited

U.S. PATENT DOCUMENTS

| 3,502,169 | A | | 3/1970 | Chapman, III |
| 4,571,693 | A | | 2/1986 | Birchak et al. |
| 4,571,694 | A | | 2/1986 | Inaba et al. |
| 4,601,024 | A | | 7/1986 | Broding |
| 4,665,511 | A | * | 5/1987 | Rodney ................ E21B 47/082 367/27 |
| 4,979,151 | A | | 12/1990 | Ekstrom et al. |
| 5,341,345 | A | | 8/1994 | Warner et al. |
| 5,354,956 | A | | 10/1994 | Orban et al. |
| 5,430,259 | A | * | 7/1995 | Warner ................ E21B 47/082 181/105 |

(Continued)

FOREIGN PATENT DOCUMENTS

WO    2017058968 A1    4/2017

OTHER PUBLICATIONS

Wong et al., Automatic time-picking of first arrivals on noisy microseismic data. 2009. 6 pages.

(Continued)

*Primary Examiner* — Bryan Bui

(57) ABSTRACT

A downhole tool for real-time caliper measurements is provided. The downhole tool comprises multiple acoustic transducers mounted at different positions of the tool, and a control system. The control system drives the multiple transducers, receives pressure echo signals from the transducers, records the pressure echo signals in the memory, extracts data of two-way transit time and echo amplitude from the echo signals, and computes at least one of a borehole diameter, a tool center position, and an acoustic slowness or velocity of downhole fluid, based on the data of transit time and echo amplitude.

19 Claims, 19 Drawing Sheets

(56) References Cited

U.S. PATENT DOCUMENTS

| | | |
|---|---|---|
| 5,640,371 A | 6/1997 | Schmidt et al. |
| 5,987,385 A | 11/1999 | Varsamis et al. |
| 6,038,513 A | 3/2000 | Varsamis et al. |
| 6,466,513 B1 | 10/2002 | Pabon et al. |
| 6,618,322 B1 | 9/2003 | Georgi |
| 6,995,500 B2 | 2/2006 | Yogeswaren |
| 8,130,591 B2 | 3/2012 | Geerits |
| 8,260,554 B2 | 9/2012 | Morys |
| 8,788,207 B2 | 7/2014 | Pei et al. |
| 2004/0095847 A1 | 5/2004 | Hassan et al. |
| 2009/0213690 A1 | 8/2009 | Steinsiek et al. |

OTHER PUBLICATIONS

J. Market and T. J. Parker (Halliburton), "Reliable LWD Calliper Measurements", SPE Offshore Europe Oil and Gas Conference and Exhibition held in Aberdeen UK, Sep. 6-8, 2011.

C. Maeso and I. Tribe (Schlumberger), "Hole Shape from Ultrasonic Calipers and Density While Drilling—A Tool for Drillers", SPE Annual Technical Conference and Exhibition held in New Orleans, Louisiana, Sep. 30-Oct. 3, 2001.

\* cited by examiner

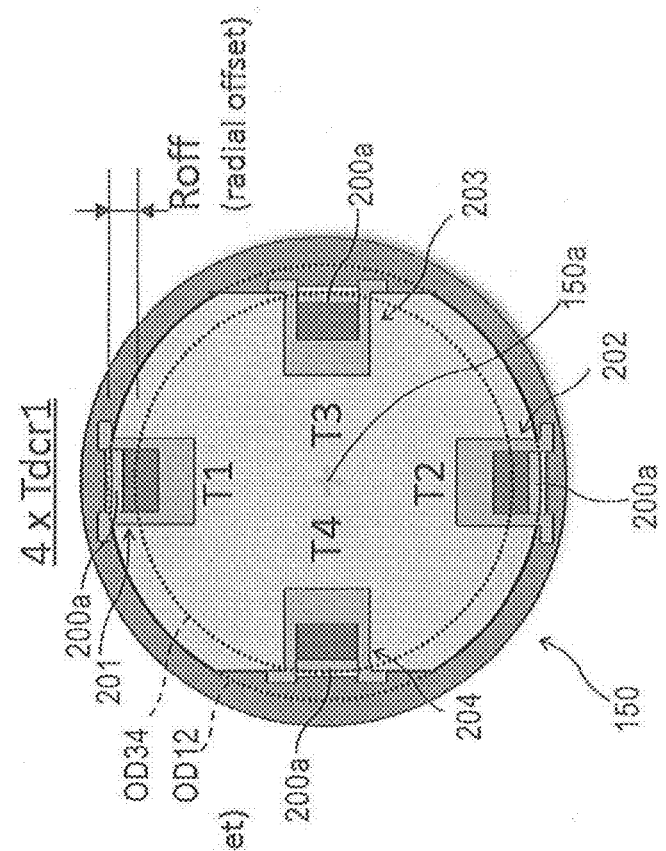
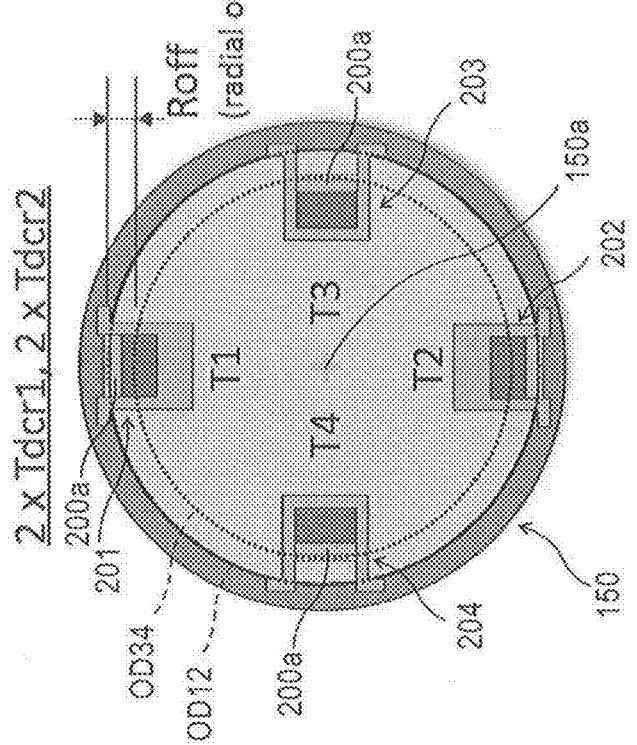
FIG. 9B
FIG. 9A

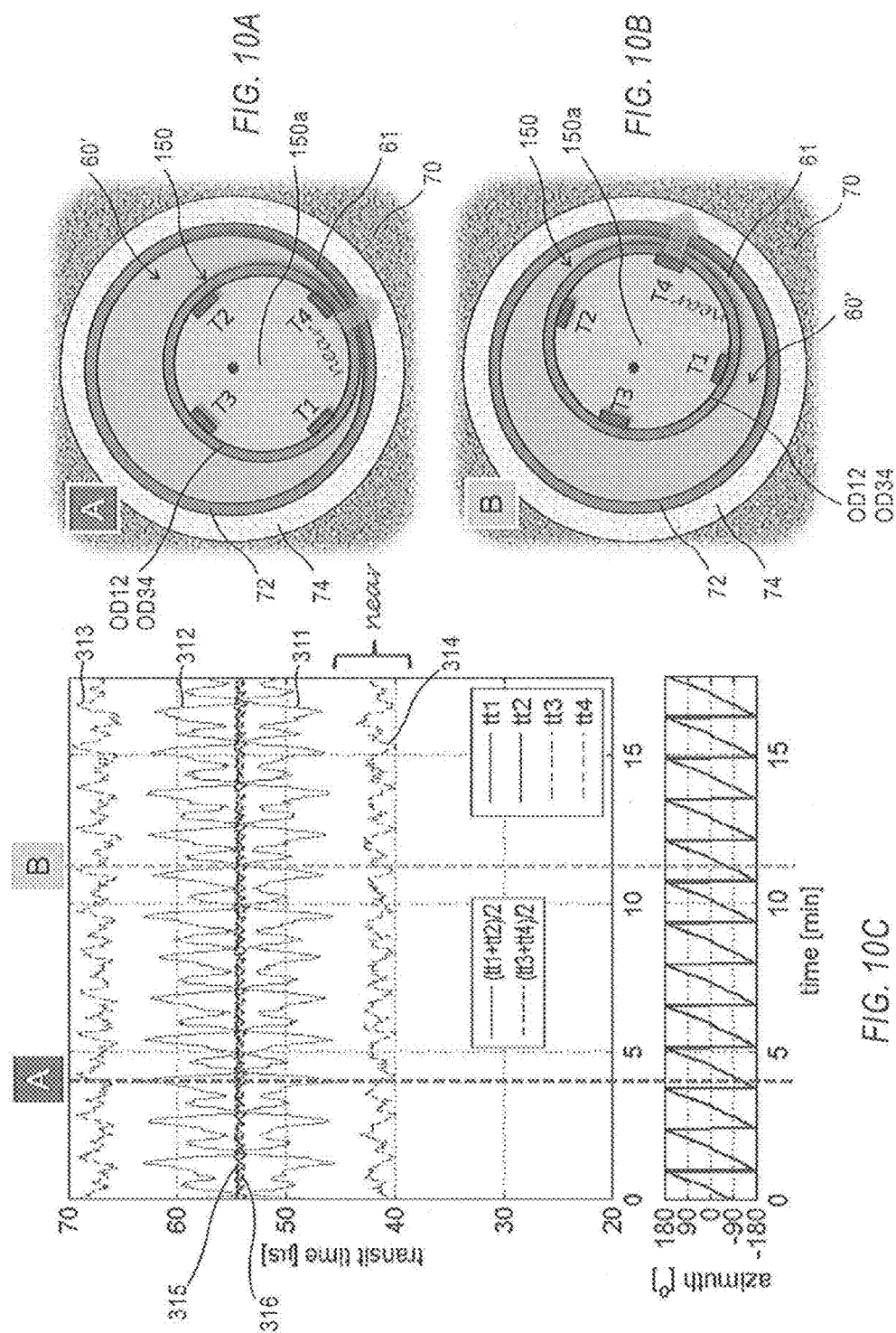

DOWNHOLE CALIPER USING MULTIPLE ACOUSTIC TRANSDUCERS

CROSS-REFERENCE TO RELATED APPLICATIONS

This application is based upon and claims the benefit of the priority of U.S. Provisional Application Ser. No. 62/246,549 entitled "DOWNHOLE ULTRASONIC CALIPER FOR LOGGING-WHILE-DRILLING APPLICATIONS," to Hiroshi Hori, filed on Oct. 26, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to ultrasonic pulse-echo caliper measurements using a downhole ultrasonic caliper. In particular, the present disclosure relates to a downhole tool using an ultrasonic caliper with multiple acoustic transducers for logging-while-drilling (LWD) and wireline logging applications.

Ultrasonic pulse-echo caliper measurements had been provided for more than 30 years in the oil field as the commercial wireline and logging-while-drilling (LWD) services. The ideas have been present since the late 1960's and the measurements usually involve already proven technologies. However, unlike the mechanical calipers commonly used in Wireline services, LWD ultrasonic pulse-echo measurements are based on a non-contacting echolocation method that is free from complex and costly mechanical system that often include expandable arms and associated mobile structures, and which may not be reliable for LWD application. Therefore, the majority of LWD tools uses non-contacting methods including ultrasonic measurements.

Ultrasonic pulse-echo measurements measure two-way transit time between an ultrasonic transducer and the borehole wall using another transducer as a transceiver. To convert the transit time to standoff or distance between the transducer and the borehole wall, the acoustic wave propagation velocity in well fluid is required (and which will be called "fluid acoustic velocity" or its reciprocal, "fluid acoustic slowness", and replacing "fluid" by "mud" hereafter).

In conventional LWD tools, the fluid acoustic velocity was often estimated from formula that relates the acoustic velocity to fluid compositions (for example, density, type of mud such as water-base, oil-base and synthetic oil-base, oil/water ratio, amount of additives such as gelifiant, solid or soluble weighting agent for example, barite or salt) and environmental parameters (for example, pressure and temperature). In the actual logging environment, the fluid acoustic velocity may not be constant but dynamically varies due to localized depth or time-dependent mud compositions in more than kilometers of well length, mud flow, pressure and temperature, formation gas/fluid influx, and amount of cuttings. Measurement of fluid acoustic velocity is required for improving accuracy and reliability of the ultrasonic caliper measurements as well as robustness.

U.S. Pat. No. 3,502,169 (Chapman/Schlumberger, 1968) discloses a principle of a downhole imager, referred to as a sonic borehole televiewer, applicable to either cased or open hole utilizing ultrasonic pulse-echo amplitude measurements. The target application is for Wireline, however, it discloses pulse-echo amplitude referring to well azimuth using a magnetometer and cable depth.

U.S. Pat. No. 4,571,693 (Birchak/NL Indusctires, Inc, 1983) discloses a principle of downhole well fluid property measurement including the well fluid's acoustic velocity, utilizing an ultrasonic pulse-echo transducer. However, this technique is dedicated for property measurement, and does not permit pulse-echo caliper measurement.

U.S. Pat. No. 4,601,024 (Broding/Amoco Coorporation, 1981) discloses a principle of ultrasonic pulse-echo imaging technique utilizing energy, and is known as a borehole televiewer (BHTV), of which the concept is similar to the technique in U.S. Pat. No. 3,502,169. In these documents, nothing is claimed on transit time data usage or a caliper application.

U.S. Pat. No. 4,979,151 (Ekstrom et al/Schlumberger, 1987) discloses one possible embodiment of two ultrasonic pulse-echo transducers to estimate acoustic impedance and acoustic wave propagation for acoustic velocity for standoff measurement, using electromagnetic measurements correction for standoff. In this document, a transducer is also proposed that is dedicated for standoff measurement instead of borehole fluid property measurements.

U.S. Pat. No. 5,354,956 (Orban et al/Schlumberger, 1993) discloses a detailed structure of one possible ultrasonic pulse-echo transducer and multiple, preferably 2, transducers mounted on a drill collar at diametrically opposed positions for downhole standoff and caliper measurements, aiming LWD applications. The reference explains materials used in transducer assemblies, e.g., lead metaniobate as piezoceramic element, PEEK window, and tungsten-loaded rubber as backing. The reference also explains measurement methods including downhole electronics, signal processors, example waveforms and their interpretation methods. For mud acoustic velocity, Orban proposes the usage of a database that provides the most probable mud acoustic velocity at given pressure and temperature conditions. Note that the disclosure of U.S. Pat. No. 5,354,956 is incorporated herein in its entirety by reference thereto.

U.S. Pat. No. 5,341,345 (Waner et al/Baker Hughes Incorporated, 1993) discloses an LWD downhole caliper and mud acoustic velocity measurements method using two transducers, i.e., one mounted on the external and another mounted on the internal surfaces of a drill pipe. The internal transducer measures the acoustic velocity inside the pipe, which may be different from the acoustic velocity measured outside due to differences in composition (borehole fluid/gas influx and cutting presence) and temperature/pressure.

U.S. Pat. No. 5,640,371 (Schmidt et al/Western Atlas International, Inc., 1995) discloses a downhole ultrasonic transducer design utilizing multiple segmented piezoelectric elements focusing on phased array beam focusing application, which is different from sensitivity or signal amplitude gain taking the benefit of impedance matching.

U.S. Pat. No. 5,987,385 (Versamis et al/Dresser Industries, Inc., 1998) discloses a downhole imaging using pulse-echo amplitude, recorded using three pulse-echo transducers in an LWD tool with pressure and temperature sensors for amplitude correction, and a magnetometer to orient recorded values to well bore azimuth. Removal of source signal, i.e. averaged waveforms, is also disclosed. Note that the disclosure of U.S. Pat. No. 5,987,385 is incorporated herein in its entirety by reference thereto.

U.S. Pat. No. 6,038,513 (Versamis et al/Dresser Industries, Inc., 1998) disclosed an elliptical fitting of standoff values using three ultrasonic pulse-echo standoff values measured using structure shown in exemplary of the foregoing U.S. Pat. No. 5,987,385. Mud acoustic velocity estimation is based on a database method similar to the one claimed in the foregoing U.S. Pat. No. 5,354,956. Estimation of the long and short axes is discussed without detailing the method.

U.S. Pat. No. 6,618,322 (Gerogi/Baker Hughes Incorporated, 2001) discloses one single pulse-echo transducer to measure mud acoustic velocity and standoff by adding a partial wave reflector at controlled distance from the pulse-echo transducer, however, the reference does not appear to explain how to compensate a measured standoff for tool eccentering, since the main application is to compensate NMR measurements for standoff.

U.S. Pat. No. 6,466,513 (Pabon/Schlumberger, 2002) discloses another possible embodiment of ultrasonic pulse-echo transducer for LWD application. The reference also discloses mud acoustic velocity measurements adding two diametrically opposed transducers in the internal annulus of the BHA (Bottom Hole Assembly). Mud acoustic velocity measurements inside the pipe has similar limitation as the technique disclosed in the foregoing U.S. Pat. No. 5,341,345. Note that the disclosure of U.S. Pat. No. 6,466,513 is incorporated herein in its entirety by reference thereto.

U.S. Pat. No. 8,130,591 (Geerits/Baker Hughes Incorporated, 2008) discloses a mud acoustic velocity measurement technique similar to the one disclosed in the forgoing U.S. Pat. No. 6,466,513.

U.S. Pat. No. 8,260,554 (Morys/Halliburton, 2009) discloses a method to measure tool positions, i.e., azimuthal orientation and two dimensional position in plane normal to borehole axis, respectively using magnetometer and orthogonally oriented accelerometers. No mud acoustic velocity measurements are discussed.

U.S. Pat. No. 8,788,207 (Pei et al/Baker Hughes Incorporated, 2011) discloses borehole geometry and tool position using standoff data recorded using multiple pulse-echo transducers (exemplary 5) in multiple turns, using iterative polygon fitting method and minimization of error. No details are discussed for mud acoustic velocity estimation. Note that the disclosure of U.S. Pat. No. 8,788,207 is incorporated herein in its entirety by reference thereto.

U.S. Pat. Application Publication No. 2004/0095847 (Hassan et al/Baker Hughes Incorporated, 2002) discloses mud acoustic velocity measurement methods using pitch-catch and two single transducers offset along the radial direction of LWD tool. The pulse-echo technique enables real-time measurements of both acoustic wave propagation speed in downhole fluid and standoff measurements, however, limited in providing sufficiently robust and precise mud acoustic velocity and caliper measurement as it assumes the tool is in stationary position in the time interval in which two transducers are at the same position in the borehole. The second assumption, the minimum transit time at the moment of tool eccentering in borehole (or the transducer is fired toward borehole at known standoff at the time of eccentering), is not reliable enough.

Claimed techniques are limited as LWD tools that prone to present non-stationary tool motion, sometimes in the mode that tool rotation and revolution are synchronized and BHA transducer mounted section is not always contacting to the borehole wall. The transit time could be shorter than anticipated value as the borehole is not necessarily parallel to the BHA, and heavy metallic BHA start reaming the wall when they are eccentered and contacting wellbore surface unless the BHA and drill strings are perfectly slick. Same limitation discussed above applies to the pitch-catch method. Note that the disclosure of U.S. Pat. Application Publication No. 2004/0095847 is incorporated herein in its entirety by reference thereto.

U.S. Pat. No. 6,995,500 (Yogeswaren/Pathfinder, 2003) discloses 1-3 piezocomposite application to downhole pulse-echo measurement taking advantage of increased sensitivity thanks to acoustic impedance coupling. The reference also discloses exemplary of 3 transducer mounting design on a tool.

U.S. Pat. Application Publication No. 2009/0213690 (Steinsiek et al/Baker Hughes Incorporated, 2009) discloses 1-3 piezocomposite application to downhole pulse-echo caliper measurement similar to the foregoing U.S. Pat. No. 6,995,500.

J. Market and T. J. Parker (Halliburton), "Reliable LWD Calliper Measurements", SPE-146245-MS (2011) discloses four transducer mounting configuration for LWD tool, however does not include fluid acoustic velocity measurements. The disclosure of this document is incorporated herein in its entirety by reference thereto.

C. Maeso and I. Tribe (Schlumberger), "Hole Shape from Ultrasonic Calipers and Density While Drilling—A Tool for Drillers", SPE-71395-MS (2001) shows an example of application of LWD caliper measurements and how mud acoustic velocity is derived at the time. The disclosure of this document is incorporated herein in its entirety by reference thereto.

However, there is no document that discloses reliable and robust downhole caliper using real-time fluid acoustic slowness or velocity measurements as disclosed below.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a downhole tool comprises multiple acoustic transducers mounted at different positions of the tool and a control system. The control system drives the multiple transducers, receives pressure echo signals from the transducers, records the pressure echo signals in the memory, extracts data of two-way transit time and echo amplitude from the echo signals, and computes at least one of a borehole diameter, a tool center position, and an acoustic slowness or velocity of downhole fluid, based on the data of transit time and echo amplitude.

In another aspect of the present disclosures, a method for caliper measurements in a borehole comprises deploying a downhole tool in a borehole, the tool including multiple acoustic transducers mounted at different positions of the tool, driving the multiple transducers, receiving pressure echo signals from the transducers, recording the pressure echo signals, extracting data of two-way transit time and echo amplitude from the echo signals, and computing at least one of a borehole diameter, a tool center position, and an acoustic slowness or velocity of downhole fluid, based on the data of transit time and echo amplitude.

In some embodiments of the disclosures herein, the multiple acoustic transducers may be four acoustic transducers mounted at different radii and azimuthal positions of the tool. Herein, a first pair of two of the acoustic transducers may be mounted at a first diameter and a second pair of other two of the acoustic transducers may be mounted at a second diameter different from the first diameter. The center of the first diameter and the center of the second diameter may be located at axes different from each other, or both centers of the first diameter and the second diameter may be located at one identical axis.

The first pair of acoustic transducers may be located offset from the second pair of acoustic transducers along the tool axis. In one example of the disclosures, the four acoustic transducers may be mounted at azimuthal positions oriented at 90 degrees relative to each other. Each data of transit time and echo amplitude may include time stamp and azimuth stamp. The control system may extract the data of transit time and echo amplitude at a speed high enough to select the data into equi-spaced multiple azimuth bins referring to magnetic field of the earth using a magnetometer.

In some embodiments of the disclosures herein, each of the acoustic transducers may have an active acousto-electrical transducer element, and is housed in a package at a recessed position relative to a reference plane. The control system may perform the computation based on a measured or estimated echo break time as well as the data of transit time and echo amplitude. The control system may also perform the computation by inputting the data of transit time and echo amplitude to an iterative optimization process, a stochastic optimization process or a root finding process. The acoustic transducers may be driven with a frequency in a range from 100 kHz to 700 kHz. The control system may apply a band-pass filter to the echo signals. The downhole tool may further comprise a telemetry for transmitting data of the at least one of a borehole diameter, a tool center position, and an acoustic slowness or velocity of downhole fluid. The downhole tool may be a LWD (logging-while-drilling) tool or a wireline logging tool.

Advantages and novel features of the disclosures will be set forth in the description which follows or may be learned by those skilled in the art through reading the materials herein. Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various described technologies. Embodiments of an acoustic transducer and a downhole tool including the same according to the disclosures herein are described with reference to the following figures. The same numbers are used throughout the figures to reference like features and components. The drawings are as follows:

FIGS. 9A and 9B illustrate two types of transducer mounting configurations for fluid acoustic velocity measurements according to an embodiment of the disclosure;

FIGS. 10A-10C illustrate transit time offset caused by biased tool eccentering direction in the downhole tool according to an embodiment of the disclosure;

DETAILED DESCRIPTION

Figure 1:
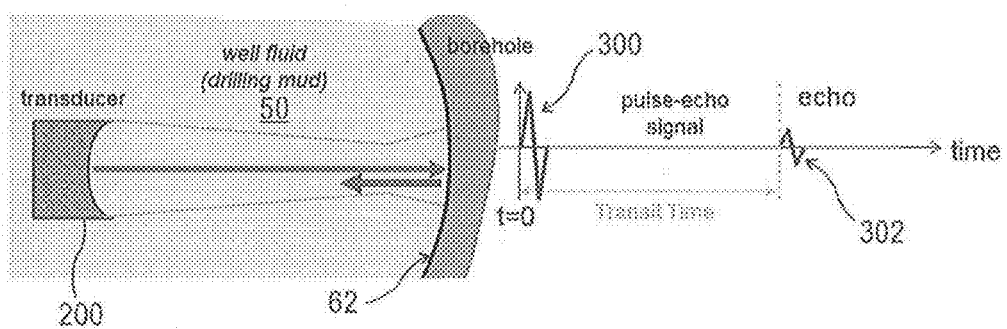
FIG. 1 illustrates one example of ultrasonic pulse-echo measurements using a downhole tool according to embodiments of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures.

Chemicals and chemical properties of interest in oilfield exploration and development may also be measured and stored by the sensing systems contemplated by the present disclosure. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Embodiments of the present disclosures can improve reliability of downhole caliper measurements using multiple transit time from unique geometrical and mounting on a downhole tool such as an LWD tool and wireline logging tool with simple statistical or stochastic data processing that includes online method. The online method is also referred as a "running" or "rolling" or "iterative" or "regressive", and the purpose is to estimate statistical values or trend of changes from dataset acquired in time series so that the number of data samples growing in time. For the caliper measurements, time period of data acquisition or segmented data length should be flexibly varied in order to measure borehole diameter and mud slowness values possibly varying along depth.

General methodologies of downhole caliper measurements using pulse-echo measurements method in terms using piezoelectric element, electronics and associated processors, storing and transmitting data using an LWD tool, and two transducers diametrically opposed mounting method are disclosed in the document of U.S. Pat. No. 5,354,956. Details of transducer assembling or structural designs for LWD measurements are disclosed in the documents of U.S. Pat. No. 5,354,956 and U.S. Pat. No. 5,341, 345, however these exemplary designs do not restrict any related modifications relevant to embodiments of the present disclosures.

Each embodiment of the present disclosures is unique in following methodologies utilizing multiple ultrasonic pulse-echo transducers for downhole caliper measurements, conducting real-time fluid acoustic velocity measurements using the same transducers. Each embodiment differentiates from the conventional techniques in improving reliability via redundancy and simultaneous mud acoustic velocity measurements without having additional dedicated velocity measurement sensors.

In some embodiments, a downhole tool includes multiple acoustic transducers mounted at different positions of the tool, and a control system, as hereinafter described.

(1) Transducer Assembly Design:

(a) Each of the transducers may include piezocomposite element as a sensing element, as described in the document of U.S. Pat. Application that claims the benefit of the priority of the U.S. Provisional Application No. 62/235,458, the disclosure of which is incorporated herein in its entirety by reference thereto. Implementation of the piezocomposite element can increase acoustic pressure excitation and echo reception. The piezocomposite may be 1-3 piezocomposite made from lead zirconate titanate and resin, both of which are durable under downhole environment.

(b) Each transducer may be flat or curved concave or even convex element, depending on applications associated with measurements. The transducer may be designed to be convex for borehole imaging, either flat or concave for caliper measurements.

(c) In one example of the transducer assembly, piezoelectric element position is measured and controlled during transducer assembling process. For example, transducer recess relative to an axial reference plane, which can be a transducer metallic housing surface, may be measured using a height gauge. Measured offset value can be used as transducer dependent parameter, if necessary.

(2) Transducers and their Mounting Methods in a Downhole Tool:

(a) The downhole tool can be either for wireline or LWD applications. Description and examples of the disclosures are focused on LWD applications. In some embodiments, the LWD tool includes four transducers in two pairs.

(b) The first pair of transducers (hereinafter refer to also as T1 and T2 (see FIG. 4)), more precisely their sensing elements, are mounted on the LWD tool at different positions defined in the following (i)-(iii):

(i) Diametrically opposed positions, at the tool azimuth $\varphi 1$ and $\varphi 2$, where $\varphi 2=\varphi 1+180$ degrees.
(ii) Radii of r1 and r2 (r1=r2 in some examples). Sensor mounting diameter SOD12 of the first pair set is the sum of r1 and r2, i.e. SOD12=r1+r2.
(iii) One axial position z of the LWD tool from a tool reference such as a read-out-port (ROP).

Sensing element material may be piezoelectric material as described above, but do not constrain usage of alternative acousto-electric transducers, such as capacitive transducers. Diametrical mounting is to minimize eccentering effect as detail example data shown in elsewhere herein. This first pair is capable of providing the caliper measurements as disclosed in U.S. Pat. No. 5,354,956.

(c) The second pair of transducers (hereinafter refer to also as T3 and T4 (see FIG. 4)), more precisely their sensing elements, are mounted on the LWD tool at different positions defined in the following (i)-(iii):

(i) Diametrically opposed positions orthogonal to the first pair, at the tool azimuth φ3 and φ4, where φ3=φ1+90 degrees and φ4=φ1+270 degrees.

(ii) Radii of r3 and r4 (r3=r4 in some examples). Sensor mounting diameter SOD34 of the second pair set is the sum of r3 and r4, i.e. SOD34=r3+r4, that is offset from SOD12 by diameter offset dos. Therefore, SOD12=SOD34+dos.

(iii) Axial position z34 of the second pair may be identical to the position z12 of the first pair.

The second pair is also capable of providing the caliper measurements as disclosed in U.S. Pat. No. 5,354,956. Either of the first or second pair can be served as a backup measurement when the other malfunctions.

(d) Combination of the first and second pairs provides the following data (i) and (ii);

(i) Well fluid acoustic velocity, without adding additional dedicated sensors, of which properties could be different from the caliper transducers.

(ii) Reliable conversion of diametrical transit time to diameter in distance.

(e) The four transducers and LWD tool can be in any designs that satisfies the above-described configuration in the sections of (2), (a) and (b), but the following designs (i)-(iii) may also be used;

(i) Four transducers of one design (Tdcr1), and mount them on the tool that has transducer mounting port holes at two different diameters. This configuration is beneficial to reduce maintenance cost using interchangeable four common transducers and simple maintenance operation.

(ii) Four transducers of two pairs, i.e., two transducer of the first design (Tdcr1) and two transducers of the second design (Tdcr2). The second transducer Tdcr2 has piezoelectric elements in axially offset position relative to the one in the first transducer Tdcr1, and its offset value is Roff. Four transducer mounting port holes are at identical radial positions from the tool center. This configuration is beneficial to keep geometrical symmetry of the tool at transducer mounting section.

(iii) Using two pairs of Tdcr1 and Tdcr2, and mount them on the tool at larger and smaller diameter. This configuration doubles diametrical offset, 2×dos. This configuration is beneficial to minimize fluid acoustic velocity measurements errors due to uncertainties of borehole conditions and electrical noise.

(3) Their Operation Using the Electronics and Tool System Controller:

(a) Wide operating frequency (for example, from 100 kHz to 700 kHz): Wide frequency band transducer excitation enables selection in spatial resolution by design. For example, relatively large low frequency components is useful for reliable echo detection in heavy-weight attenuative drilling mud otherwise under the presence of cuttings and low reflectivity borehole due to rugosity and deformation. High frequency components in light-weight drilling mud is useful to improve resolution particularly for wellbore imaging application.

(b) Simultaneous firing and echo detection: The tool acquires pulse-echo signals from the transducers simultaneously, starts firing (driving) at the same time, uses common band-pass filtering and detects pressure echo signals, as described below, so that no uncertainty or delay caused by sequential firing as described in the U.S. Pat. No. 5,354,956.

(c) Echo detection and its attribute recording: The control system of LWD tool performs the following acquisition (i) and recording (ii);

(i) Acquisition and its timing: The pulse-echo signals are processed using a downhole processor in the control system, and attributes representing the feature of borehole echo are extracted from the pulse-echo signals and are recorded with data such as time stamp and azimuth stamp. The control system may be designed for high density data acquisition in time aiming for wellbore imaging applications, for instance, every 1 msec.

(ii) The attributes to be recorded may be amplitude, time, phase and instantaneous frequency at the peak of Hilbert envelope for imaging and quality control purposes, and time of echo break for caliper measurements in precision. Details of the attributes are explained elsewhere herein. Downhole software executed in the processor may be designed in such a way that their recording can be enabled or disabled as options.

(d) Variable gain: In order not to saturate or lose the pulse-echo signals in wide variety of logging environment, e.g. large standoff and mud acoustic attenuation range, the electronics and acquisition system in the control system may have capability of varying acquisition signal amplitude, either by firing voltage or receiving gain, preferably receiving gain.

(4) Instantaneous Mud Acoustic Slowness and Caliper Measurements:

In some embodiments, mud acoustic velocity and caliper measurements are available for each data, which corresponds to instantaneous measurement. Instantaneous measurements can be further processed using statistical or stochastic method to minimize measurement errors. Mud acoustic slowness (which is reciprocal of velocity) and caliper data can be processed using, downhole data processing system, following the steps (a)-(m), which does not limit the method to the particular example. Additional steps or parameters to form a dataset can be included.

(a) Load pulse-echo beak time data of four transducers T1, T2, T3 and T4 in four vector data, tt1(i), tt2(i), tt3(i) and tt4(i), herein i is data index with time and azimuth stamps, respectively t(i) and θ(i). A vector data may be referred as array or array vector. The index (i) may be ignored to refer the vector data, for example, tt1 in place of tt1(i). The time stamp t(i) is to indicate when the data is acquired, for example, referring to downhole clock time. The azimuth stamp θ(i) is magnetic reference of the tool orientation, often referred as magnetic tool face. The vector data may be sorted in either in acquired chronological order, or may be in the order of azimuth stamp, or may be both. For example, tt1 vector may start from magnetic north (N) at i=1. tt2(1), tt3(1) and tt4(1) vectors start from the data acquired at azimuth 180 degrees (S), 90 degrees (E) and 270 degrees (W). The second pair transducers T3 and T4 mounting radii on the tool is smaller than that of the first pair T1 and T2, thus generally tt3, tt4>tt1, tt2. Transducer mounting diameter of T1 and T2, and T3 and T4 pairs are, respectively, SOD12 and SOD34.

(b) Load pulse-echo peak amplitude data of four transducers in four vectors of amp1(i), amp2(i), amp3(i) and amp4(i), acquired at the same time as the break time data tt1(i), tt2(i), tt3(i) and tt4(i). They are used together with noise amplitude threshold of respective transducer, amp1_th(i), amp2_th(i), amp3_th(i) and amp4_th(i) to control their quality. The values can be index-dependent or constant, preferably the latter.

(c) Compute two diametrical transit time vectors that are defined as $tt12(i)=(tt1(i)+tt2(i))/2$, $tt34(i)=(tt3(i)+tt4(i))/2$.

(d) Compute two differential transit time vectors that are defined as dtt12(i), $(tt2(i)-tt1(i))/2$, $dtt34(i)=(tt3(i)-tt4(i))/2$ as the quality control of tool eccentering.

(e) Control the quality of the differential transit time for echo amplitude and tool eccentering. At the azimuth index where either of amp1(i) or amp2(i) is smaller than their respective noise threshold amp1_th(i) and amp2_th(i), dtt12(i) is considered to be unreliable. The threshold values of amp1_th and amp2_th can be time-dependent or constant, preferably the latter.

At the azimuth index where either of amp3(i) or amp4(i) is smaller than their respective noise threshold amp3_th(i) and amp4_th(i), dtt34(i) is considered to be unreliable.

At the azimuth index where dtt12(i) or dtt34(i) is greater than a pre-set threshold value $dtt_{OL}(i)$, the tt12(i) and tt34(i) values are considered to be unreliable, being affected by either tool eccentering or borehole shape irregularity. The threshold value $dtt_{OL}(i)$ can be time-dependent or constant, preferably the latter.

The time gather is the dataset acquired in time interval T(I) in [tmin(I), tmax(I)]. i_start(I) and i_end(I) are respectively the minimum and maximum data index in the interval. N(I) is data index integer vector. If the gather is acquired chronologically, N(I) may be identical to the time index. I is serial number of dataset. The dataset can be mapped to other reference of measurement, such as depth of the tool referring to T(I). T(I) and N(I) may be defined flexibly following design rules, for example, the dataset may be acquired in constant time interval of 2 seconds, in the time interval in which the tool makes 1 rotation, or constant number data samples of 10000, or in 1 tool rotation but re-ordered referring to azimuth stamp θ, or sorted into azimuth bins, and the examples do not limit to design different ways. For azimuth binning, azimuth index j is integer between 1 and J of their center angle and width defined as Θ(j) and 2·δΘ. J is any integer equal or larger than 1 and product of 2*δΘ*J is equal to full azimuth 360 degrees. There is no azimuth binning when J is equal to 1.

Figure 5:
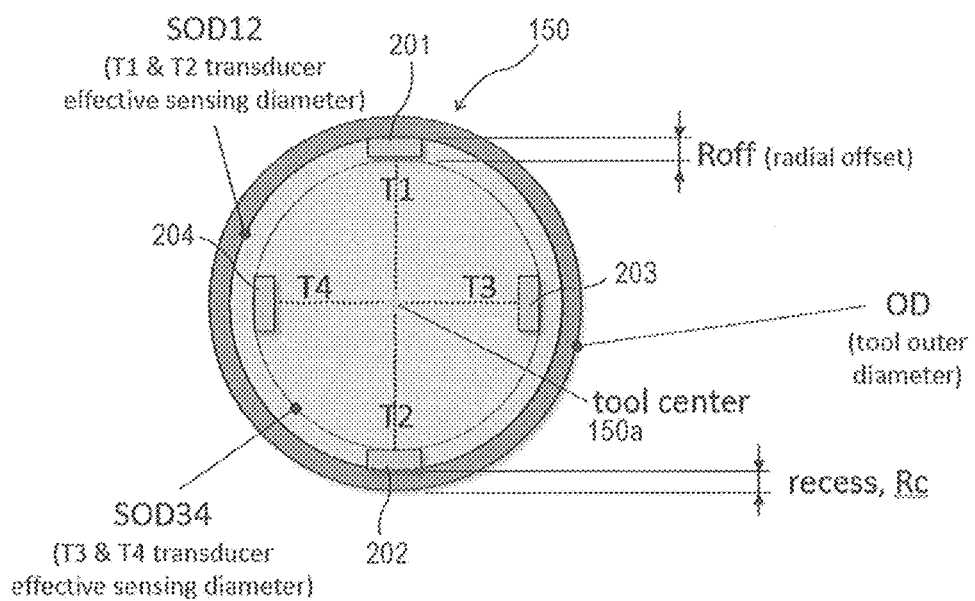
FIG. 5 illustrates a transversal cross section of another example of a downhole tool with four acoustic transducers according to an embodiment of the disclosure.

An exemplary dataset is one acquired using T1, T2, T3 and T4 transducers as configured in FIG. 5, and is binned into 2-degree azimuth bins or 180 bins in 360 degrees, starting from 0 degree. Data index vector N is [1, 2, 3, . . . , 179, 180]. The transducers and tool may be rotated in clockwise direction and tool azimuth values may increase.

(f) Re-orient tt34 by 90 degrees, i.e., new tt34 is sorted in the order of tt34 (136, 137, . . . , 180, 1, 2, . . . , 135) or tt34(i+ioff(i)), where the first 45 and the second 135 elements of ioff may be respectively 135 and −45.

(g) Subtract the diametrical transit time vectors to derive temporary differential diametrical transit time vector, dtt_tmp(i)=tt34(i+ioff(i))−tt12(i). Temporary dtm_tmp(i) may be computed as dtm_tmp=dtt_tmp/dos, where dos is diametrical offset of transducer piezoelectric element positions between two sets of pairs.

(h) Compute the final diametrical transit time vector, dtt, as the average of the first and second halves of dtt_tmp.

The first and second halves of the temporary vector are differential diametrical transit time measured at the same orientation. For example, two differential values, dtt_tmp(1) and dtt_tmp(91), that are measured when T1-T2 pair is oriented to North-South, and South-North, so that they should have the same value. The length of dtt vector is half of the transit time vector length. Alternatively, dtt can be computed as arithmetic average or median value of a set of time series vector data, dtt_tmp, after excluding outliers referring to amplitude values. Example outliers dtt_tmp(i) are the ones which do not satisfy [amp1(i)>amp1_th(i), amp2(i)>amp2_th(i), amp3(i+ioff(i))>amp3_th(i+ioff(i)), amp4(i+ioff(i))>amp4_th(i+ioff(i))).

(i) Compute mud acoustic slowness array or vector, dtm is equal to dos/dtt.

(j) Compute dtm_med(i), a median value of dtm vector as representative mud acoustic velocity of the dataset.

(k) dtm_med can be further smoothed applying moving median window of pleural dataset.

(l) Using dtm_med, one can compute 2-dimensional ultrasonic caliper readings of 2 diametrically paired transducers as, respectively, ucal12(i)=(tt12(i)*dtm_med(j)+SOD12 and ucal34(i,j)=tt34(i)*dtm_med(i)+SOD34.

(m) Control quality of the caliper array or vector data referring to the amplitude and transit time. Break time value may be unreliable when echo amplitude is lower than pre-set amplitude threshold, amp1_th(i), amp2_th(i), amp3_th(i) and amp4_th(i), where i is the data index. The values can be alternatively one single constant for each transducer or all transducers.

(5) Borehole Geometry and Tool Position Inversion Solving Optimization Problem:

One way of borehole geometry and tool position finding methods (excluding mud acoustic velocity) is disclosed in U.S. Pat. No. 8,788,207. After knowing the tool "position" and "borehole geometry" using the tool and transducers in the disclosed design, an added offset transducer, at least one, in the tool provides another transit time data recorded at known direction of inverted "borehole geometry". Geometry or position in parenthesis indicates that they are not in distance but in transit time unit. Using the transit time of transducers in disclosed design and added transducers at the same borehole direction, mud acoustic velocity can be computed by dividing the offset value by the transit time difference between disclosed transducer and added transducer.

Alternatively, a joint inversion of borehole geometry, tool position and mud acoustic velocity may be used. This method is to invert three geometrical values in interest by solving optimization problem. For such method, transducers and their mounting methods in embodiments of the present disclosures are useful.

Hereinafter, details of ultrasonic pulse-echo measurements using the downhole tool with multiple acoustic transducers according to embodiments of the disclosure are described.

1. Pulse-Echo Signal and Attributes:

FIG. 1 illustrates one example of ultrasonic pulse-echo measurements using a downhole tool. Gray area in the left of the figure shows one ultrasonic transducer 200 including a piezoelectric element, which is located in well fluid 50 such as drilling mud. The transducer 200 excites acoustic impulse at ultrasonic frequency in wide frequency band. The impulse propagates from the transducer 200 to the borehole wall 62, and is reflected at formation and fluid interface, and then travels back to the transducer 200. Electrical signal, typically voltage, is acquired and recorded using a control system including electronics and a digital data processing system of the tool. In the right side of the figure, time-domain pulse-echo signal is illustrated in gray curve. Portions of the signal curves 300 and 302 respectively correspond to firing voltage and borehole echo signal.

Figure 2:
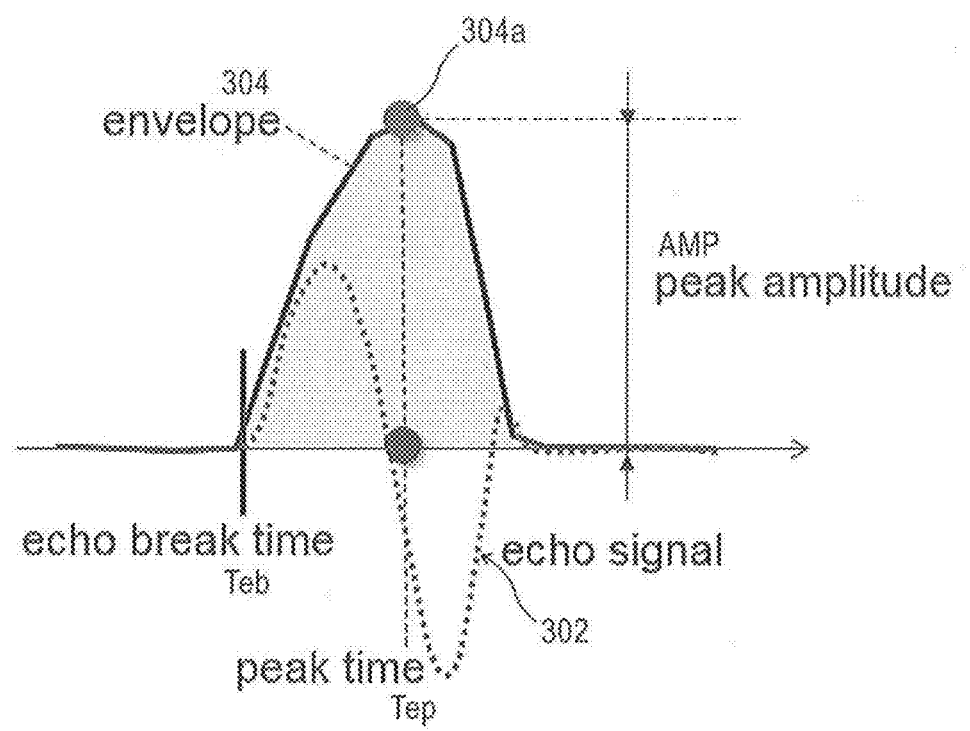
FIG. 2 illustrates a magnified view of the echo waveform output from an acoustic transducer according to an embodiment of the disclosure.

FIG. 2 illustrates a magnified view of the echo waveform output from an acoustic transducer 200. Waveforms are preprocessed, for example, removing transducer ring-down and applying band-pass filter. After pre-processing, a Hilbert envelope 304 of echo waveforms is computed to extract envelope peak value 304a at the amplitude maximum. For caliper measurements, required transit time is ideally echo break time Teb. Exact echo envelope break time Teb is challenging to detect under the presence of noise including residual of the transducer ring down. Therefore, the break time Teb may be estimated using the peak time Tp and envelope data, and the estimated break time Teb may be used for the caliper measurement for precision relative to the measurements using the peak time Tp.

Figure 3:
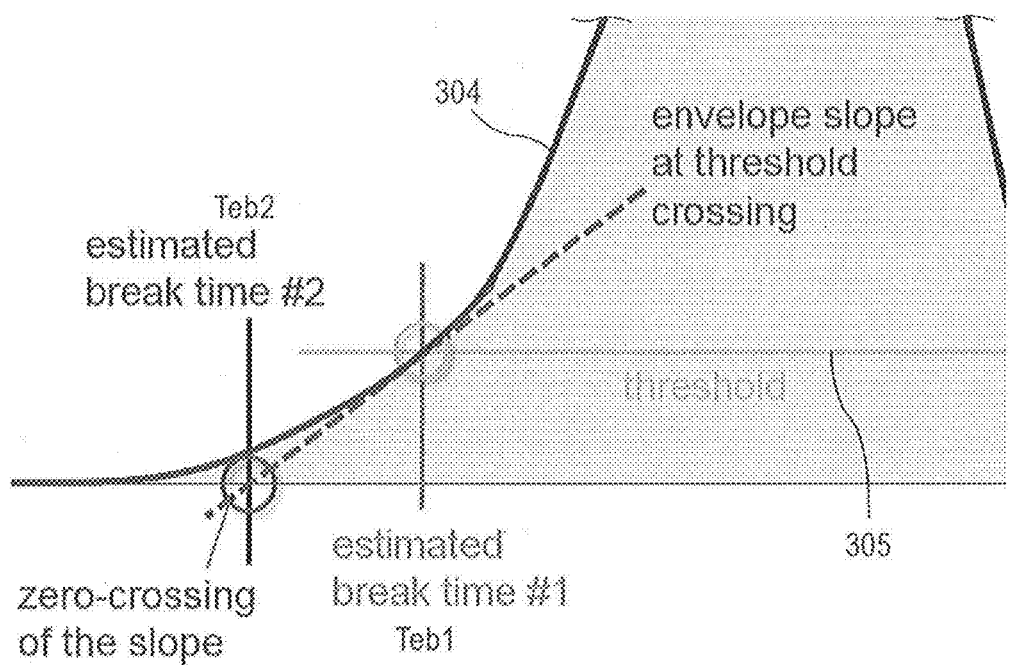
FIG. 3 illustrates a zoom-up view of envelope near an echo break time according to an embodiment of the disclosure.

FIG. 3 illustrates a zoom-up view of envelope 304 near an echo break time Teb. Transit time data for caliper measurement is ideally the echo break time Teb. Echo break time Teb can be estimated from different ways, for example, by tracking back the envelope 304 and finding out crossing time of pre-set threshold 305, for example, at X % of the peak amplitude, where X is constant value such as 20. This threshold crossing time provides first coarse estimate of the envelope break time #1 (Teb1). To refine the estimated value in the order of microsecond, an averaged envelope slope may be computed using pleural data points including threshold crossing, and the slope may be extrapolated to compute the zero-crossing. This zero-crossing may be used as the final estimate of echo break time #2 (Teb2).

2. Ultrasonic Transducer Mounting Method:

Mounting method of two transducers, at diametrically opposed positions, is disclosed in U.S. Pat. No. 5,354,956. This diametrical mounting can be extended for mud acoustic velocity measurements in embodiments of the disclosures.

Figure 4:
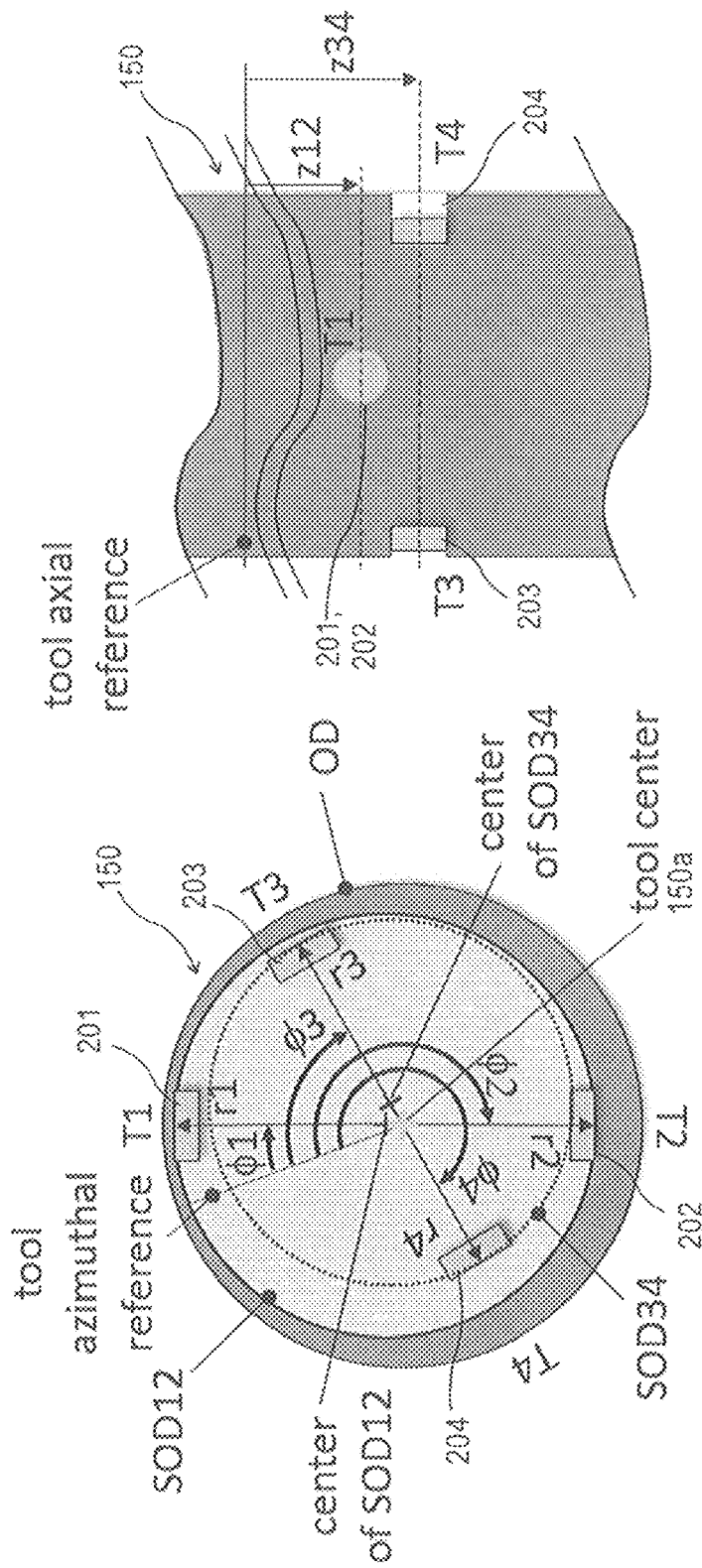
FIGS. 4A and 4B illustrate transversal and longitudinal cross sections of one example of a downhole tool with four acoustic transducers according to an embodiment of the disclosure.

FIGS. 4A and 4B illustrate transversal and longitudinal cross sections of one example of a downhole tool 150 with four acoustic transducers 201-204. FIG. 5 illustrates a transversal cross section of another example of a downhole tool with four acoustic transducers. In FIGS. 4 and 5, the acoustic transducers 201-204, more precisely, transducer's sensing elements, are diametrically mounted at different positions on an LWD tool 150 in two pair sets. The first pair includes two transducers 201 (T1) and 202 (T2) at the diameter of SOD12, the second pair includes two transducer 203 (T3) and 204 (T4) at the diameter of SOD34. Two transducers in each pair are mounted on the tool 150 at 180-degree apart oriented positions along tool azimuth. Two pairs may be mounted at any azimuthal positions of the tool 150, as long as they are not aligned at the identical azimuth as shown in FIGS. 4A and 4B. Two pairs may be also mounted so that four transducers 201 (T1)-204 (T4) are mounted at azimuthal positions oriented at 90 degrees relative to each other as shown in FIG. 5.

The maximum transducer mounting radius is smaller than the maximum tool outer diameter (OD). Larger tool diameter is for protecting transducers from mechanical wear and damage when tool surface is rubbing on the borehole wall. The centers of SOD12 and SOD34 are located at the center 150a of the tool 150 in FIG. 5, but may be located at arbitrary offset positions from the tool center 150a as shown in FIG. 4A.

Figure 8:
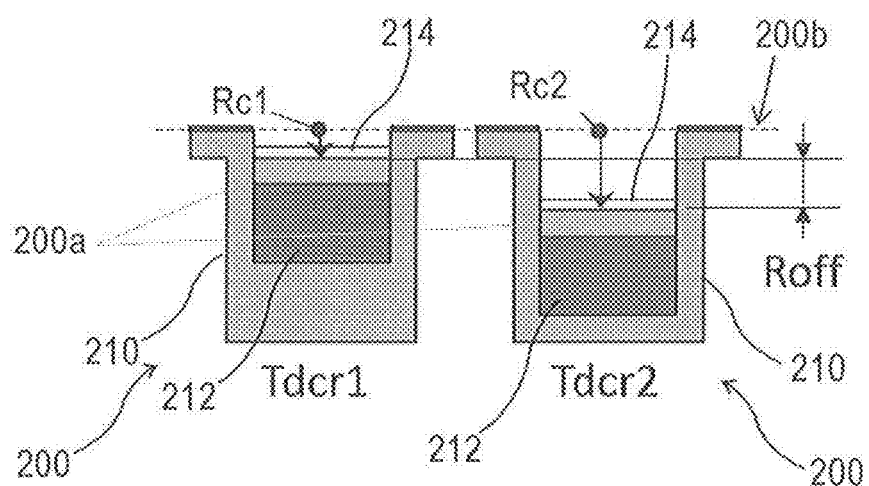
FIG. 8 illustrates conceptual designs of two transducers having piezoelectric elements at axially offset positions according to an embodiment of the disclosure.

Each transducer 201 (T1)-204 (T4) has sensing element at recessed positions relative to their respective reference plane as detailed in FIG. 8. The recess values of four transducers are defined, respectively, as Rc1, Rc2, Rc3 and Rc4. Sensing elements mounting diameters are defined as SOD12 and SOD34, and their values are, respectively, SOD12=OD12−(Rc1+Rc2) and SOD34=OD34−(Rc3+Rc4). Eventually, this configuration provides the diametrical offset, dos as the absolute difference between SOD12 and SOD34, i.e., dos=abs (SOD12−SOD34). This diametrical position difference, dos is used for computing the well fluid acoustic velocity.

Figure 6:
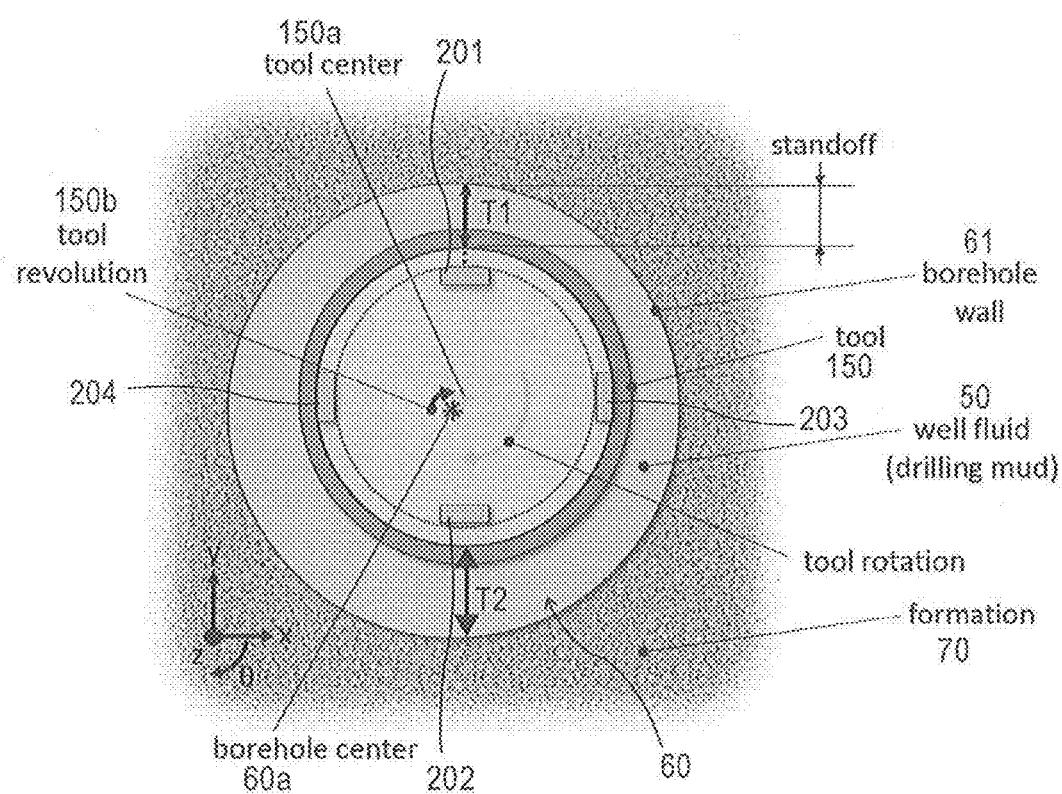
FIG. 6 illustrates a transversal cross section of the downhole tool deployed in a borehole.
Figure 16:
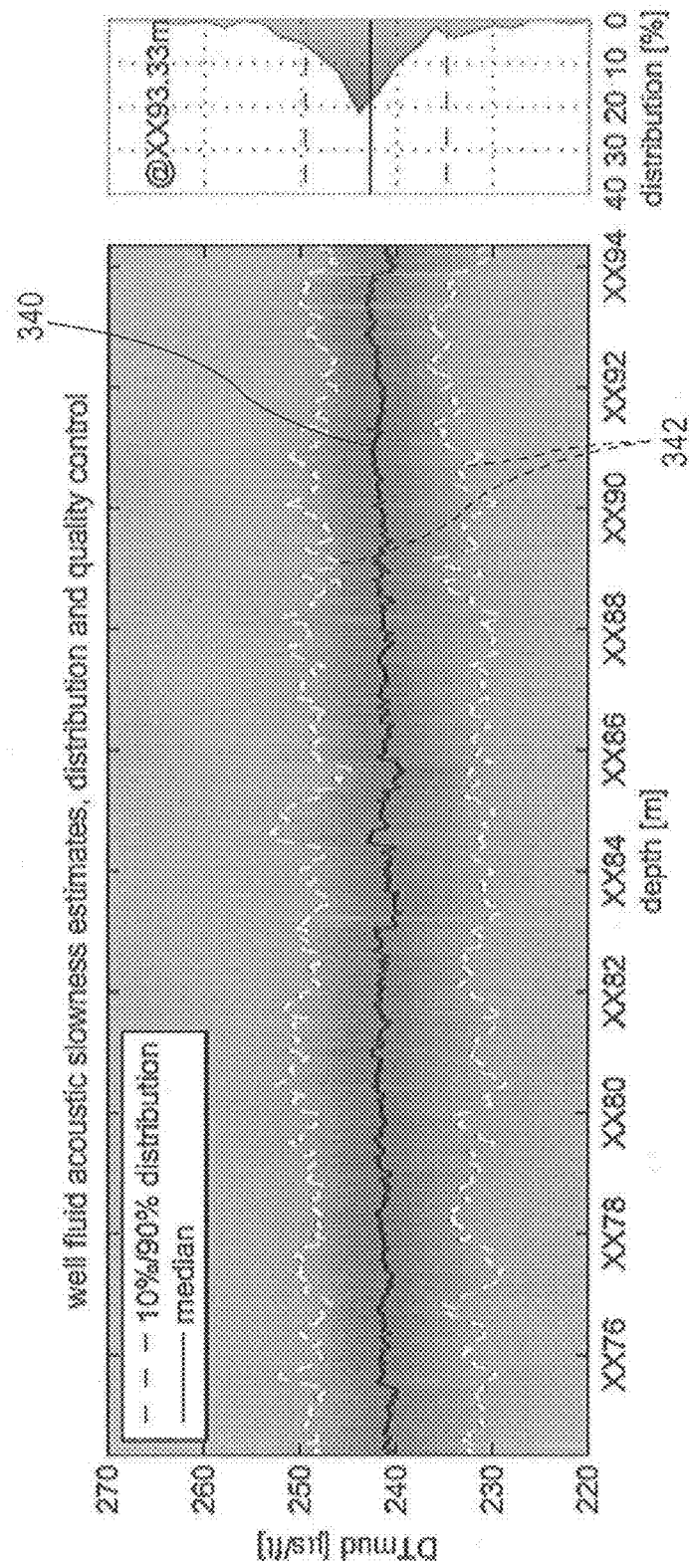
FIG. 16 shows one possible example of well fluid acoustic slowness value presentation with their quality control according to an embodiment of the disclosure.

FIG. 6 illustrates a transversal cross section of the downhole tool 150 deployed in a borehole 60. FIG. 16 shows 2-dimensional projection of the transducers 201 (T1)-204 (T4) in a borehole 60. The tool 150 is identical to the one shown in FIG. 5. Area in sandy texture shows formation 70 and area between the outer surface of tool 150 and a borehole wall 61 is filled with well fluid 50 (i.e. mud in borehole). Black asterisk marker indicates the borehole center 60a (or gravity or areal center). While drilling, the tool 150 rotates around the tool center 150a in the direction 150b and at the same time, the tool center 150a is moving in the wellbore 60 in two ways, in-plane translation (x, y), which causes tool center revolution around the borehole center 60a. The actual tool is moving in 3-dimension including axial (z) motion, and this figure is simplified 2-dimensional projection to explain tool motion in the borehole 60 and caliper measurements principle. The distance between a transducer mounting reference plane of the tool 150 and the borehole surface 61 is referred to as a standoff. The borehole diameter is equal to the sum of the diameter of the transducer mountings, T1 standoff and T2 standoff.

Figure 7:
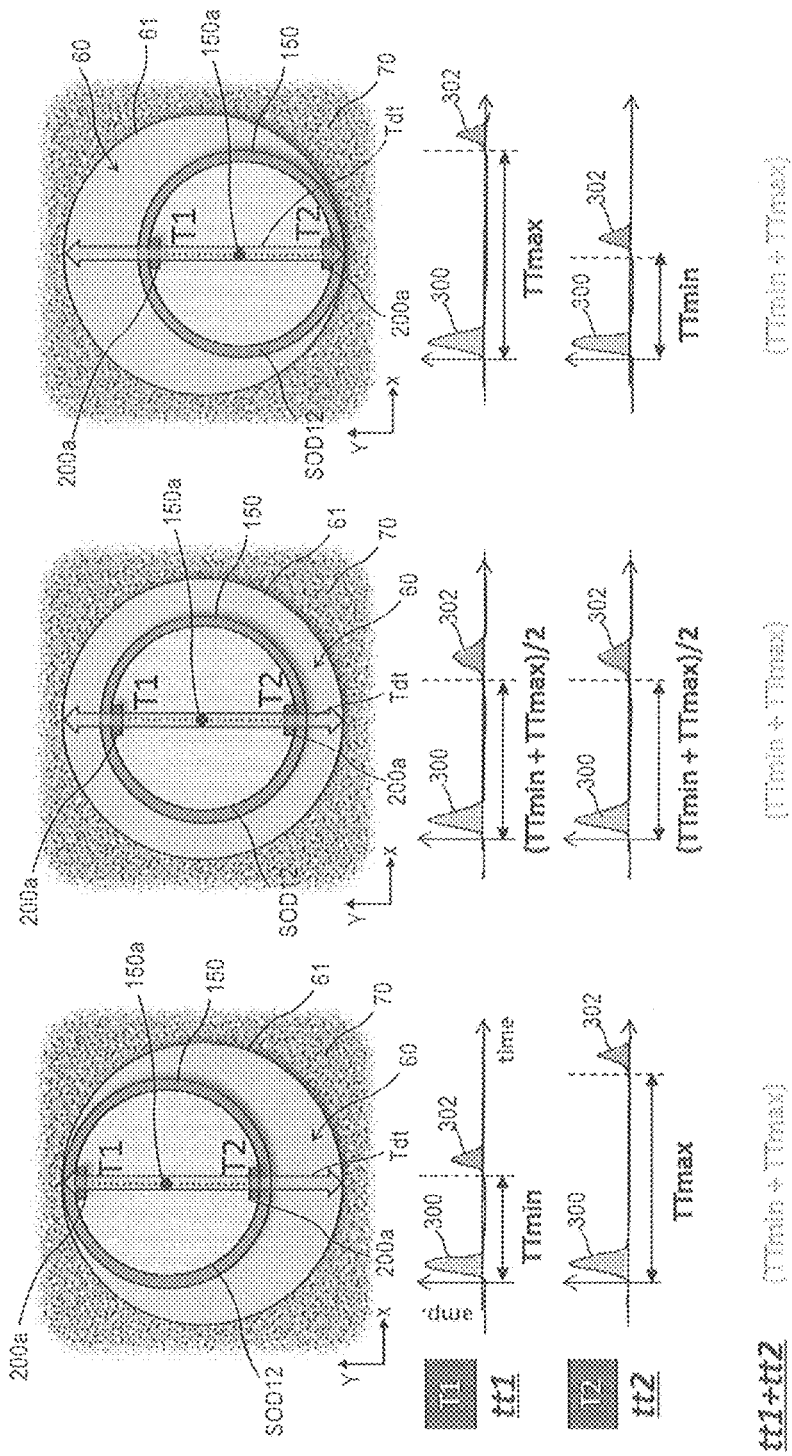
FIGS. 7A-7C illustrate diametrical transit time unaffected by tool eccentering in the downhole tool according to an embodiment of the disclosure.

FIGS. 7A-7C illustrate diametrical transit time unaffected by tool eccentering in the downhole tool 150. FIGS. 7A-7C present an eccentering effect on single and diametrically paired transducers, using simplified tool model in perfectly circular hole as a borehole 60. One pair of sensing elements 200a of transducer assemblies of T1 and T2 are mounted at the same radial positions of the tool 150. The tool 150 is moving vertically in the direction of y-axis without rotation or displacement along x-axis.

Three schematic views from the left (FIG. 7A) to right (FIG. 7C) respectively show tool at three different positions in the borehole 60, i.e., fully eccentered toward the top in FIG. 7A, centered in FIG. 7B, and fully eccentered toward the bottom in FIG. 7C. In the second and third rows in each of FIGS. 7A-7C, pulse-echo signals 302 of T1 and T2 transducers are illustrated. The transit time of T1 and T2 transducers are respectively defined from their firing starting time, and named as, tt1 and tt2.

When the tool 150 is fully eccentered toward T1 as in FIG. 7A, tt1 and tt2 respectively take the minimum and maximum values, i.e., TTmin and TTmax. When the tool 150 is centered as in FIG. 7B, both T1 and T2 takes the same values, i.e. average of TTmin and TTmax. When the tool 150 is fully eccentered toward the bottom as in FIG. 7C, tt1 and tt2 respectively take TTmax and TTmin. On the other hand, diametrical transit time Tdt, which is the sum of tt1 and tt2, always takes one constant value, TTmin+TTmax. Arrows Tdt in FIGS. 7A-7C illustrates constant diametrical transit time (TTmin+TTmax), irrelevant of tool eccentering.

When acquiring transit time of single transducer over long time period (order of hour, for instance), tool eccentering effect can be minimized statistically, based on an assumption that tool positions and orientations in a borehole is nearly random and equally distributed. This assumption is applicable over long time duration, but not applicable to the time interval in which a downhole tool is making a couple of turns. Robust caliper measurements are required in such relatively short time (e.g. order of minute), in which the tool may show systematically biased motion as it is explained below by referring to FIG. 10.

To realize diametrical offset (hereinafter refer to as "dos" or "DOS") of four transducers in a downhole tool, there are multiple implementational options. In embodiments of the present disclosures, two exemplary designs are described illustrating potential implementation of transducers.

FIG. 8 illustrates conceptual designs of two transducers 200 (Tdcr1 and Tdcr2) having piezoelectric elements 200a at axially offset positions. The transducers 200 (Tdcr1 and Tdcr2) have their respective piezoelectric element 200a at axially offset positions of Roff. In this example, element offset Roff is identical to the half of dos. Each transducer 200 includes a metallic transducer housing 210, piezoelectric element 200a, a backing 212 and a diaphragm 214. The transducer housing 210 of each transducer Tdr1 and Tdcr2 is in identical design. In the housing 210, piezoelectric elements 200a are located at different recess values, Rcn, where n=1, 2, 3, 4, which is the distance from a housing reference plane 200b at the transducer top and the front face of respective piezoelectric element 200a.

The housing reference plane 200b is used as a reference of transducer position when they are mounted on the tool 150. FIG. 8 only shows conceptual transducer mounting configurations on the tool 150, so that the configurations may not be identical to the actual detail transducer designs. For example, the piezoelectric elements 200a may have concave or convex shape in lieu of flat shape, so that the elements 200a could be smaller than the internal diameter of the housing 210. The elements 200a may also have circular or rectangular shape when they are seen from the front face. Transducer assemblies may have additional components which are not displayed.

FIGS. 9A and 9B illustrate two types of transducer mounting configurations for fluid acoustic velocity measurements. In the first configuration shown in FIG. 9A, two standard transducers 200 (Tdcr1) are mounted at the tool diameter, OD12, at T1 and T2 positions, and two offset transducers 200 (Tdcr2) are mounted at the tool diameter, OD34, at T3 and T4 positions. Four transducers 201-204 are mounted at identical diameter of the tool (i.e., OD12=OD34), and two different transducer recess provides the radial offset, Roff for fluid acoustic velocity measurements.

In the second configuration shown in FIG. 9B, four standard transducers 200 (Tdcr1) are mounted at positions of different diameters of the tool 150, T1 and T2 at the positions with larger diameter, T3 and T4 at the positions with smaller diameter of the tool 150. In this configuration, two mounting diameters provide the offset Roff.

Two more mounting configurations are possible. For example, in the third configuration, two standard transducers (Tdcr1) are mounted at the positions (T1 and T2) with larger diameter of the tool shown in FIG. 9B, and two offset transducers (Tdcr2) are mounted at the positions (T3 and T4) with smaller diameter. Resulting diameter difference between T1 and T2, and T3 and T4 pairs is twice as large as Roff.

In the fourth configuration, which is not relevant to embodiments of the disclosure, two standard transducers (Tdcr1) are mounted at the smaller diameter and two offset transducers (Tdcr2) are also mounted at the smaller diameter. This configuration may not provide offsets for the fluid velocity measurements, but the configuration is able to position four transducers at identical diameters. This configuration is similar to mounting four identical design transducers on the collar shown in FIG. 9A, which could be useful to provide identical quality of attributes from four transducers in terms of focusing.

FIGS. 10A-10C illustrate transit time offset caused by biased tool eccentering direction in the downhole tool. In FIG. 10A, the actual transit time data acquired downhole, in a vertical cased hole 60' surrounded by a metal casing 72 and cementing 74, over the time interval of 15 minutes under bit-off-bottom condition is presented. Magnetometer azimuth (θ, unit: degree) readings are shown in the bottom of FIG. 10C, in the range from −180 to 180 degrees. When a magnetometer value is equal to 0, T1 transducer is facing to the magnetic North. It is noted that the magnetometer readings might be affected as the tool is in a steel casing.

In this data acquisition, four transducers, T1, T2, T3 and T4, are mounted on the collar at identical diameters to demonstrate diametrical transit time precision. The horizontal and vertical axes of the graph in FIG. 10C are respectively time (unit: minute) and transit time (unit: μs). The gathering of the transit time data, tt1, tt2, tt3 and tt4 for multiple turns, are respectively presented in a first solid curve 311, a second solid curve 312, a first dashed curve 313 and a second dashed curve 314. Diametrical one-way transit time (or averaged two-way transit time, (tt1+tt2)/2 and (tt3+tt4)/2) of paired transducers of T1-T2 and T3-T4 are respectively presented in a solid line 315 and a dashed line 316.

Two dashed curves 313 (tt3) and 314 (tt4) stably and respectively takes the minimum and maximum transit time among four transducers, because the tool is constantly eccentered toward T4 direction. Transit time of T1 and T2 are in between that of T3 and T4, and T1 transit time (tt1). Then, the tool rotates 12 times in about 17 min at an averaged rotation speed 41 rpm. Tool eccentering is so large during observed time interval, so that transit time fluctuates and shows higher-order harmonics, mainly 2θ, azimuthal dependency. Even under such conditions, the diametrical transit time is a stable transit time approximating 54 μs.

To help understanding of above discussion, snapshots of tool positions at time A and B, are shown in FIGS. 10A and 10B. Top side of the snapshots is magnetic North.

In some embodiments, pulse-echo signal amplitude are expected to be lowered, for example, in the zones where a borehole is damaged due to natural causes or/and drilling operation, in such that we find features named, fracture, breakout and key seating, or simply roughened borehole surface. Pulse-echo transducers generally have noise, so called ring-down 306 (see FIGS. 11 and 12), which is a result of electrical firing to excite a pressure impulse in wellbore fluid. Transducers are designed to damp such ring-down by adding backing, however, when the echo amplitude becomes smaller than −80 dB of firing voltage amplitude, reliable echo detection is challenging, particularly at short standoff. Removal of such ring-down waveform is one of important processes. Therefore, a ring-down waveform may be estimated as transducer baseline for each transducer and the estimated baseline may be removed as a part of pre-processing, and then, band-pass filtering and echo envelope peak search may be applied.

Figure 11:
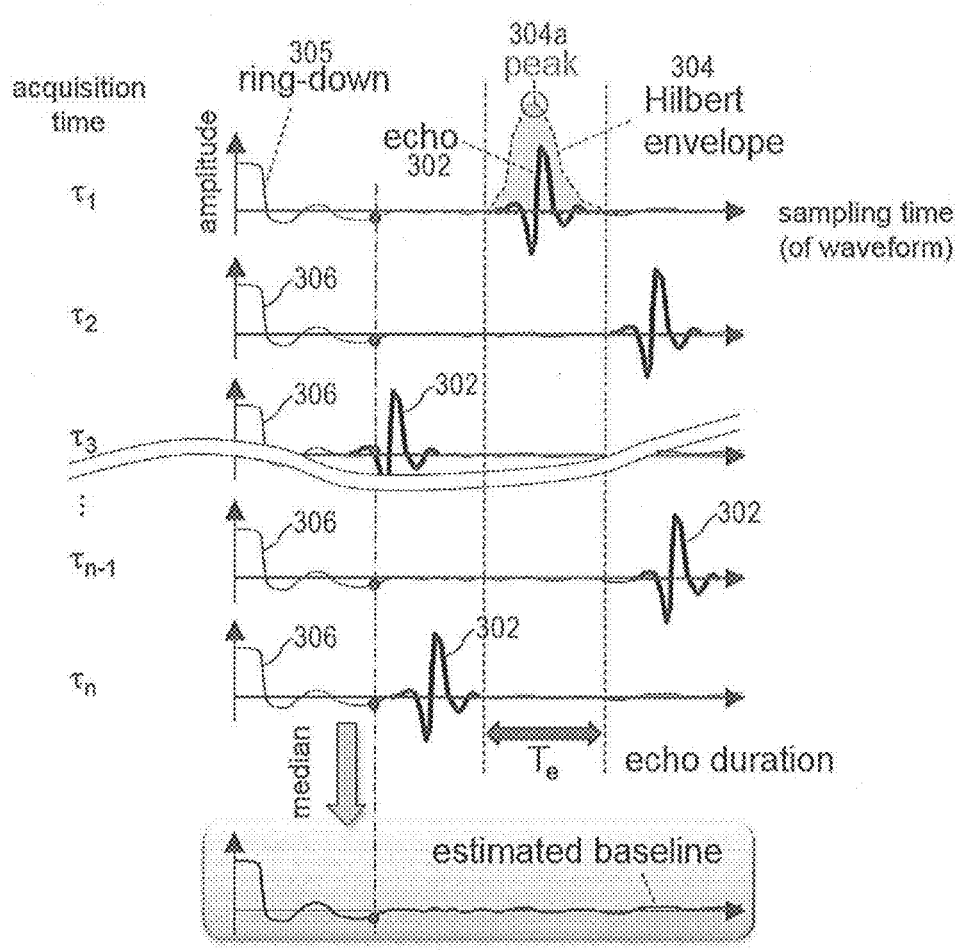
FIG. 11 illustrates a baseline estimation allowed when the tool is eccentered.
Figure 12:
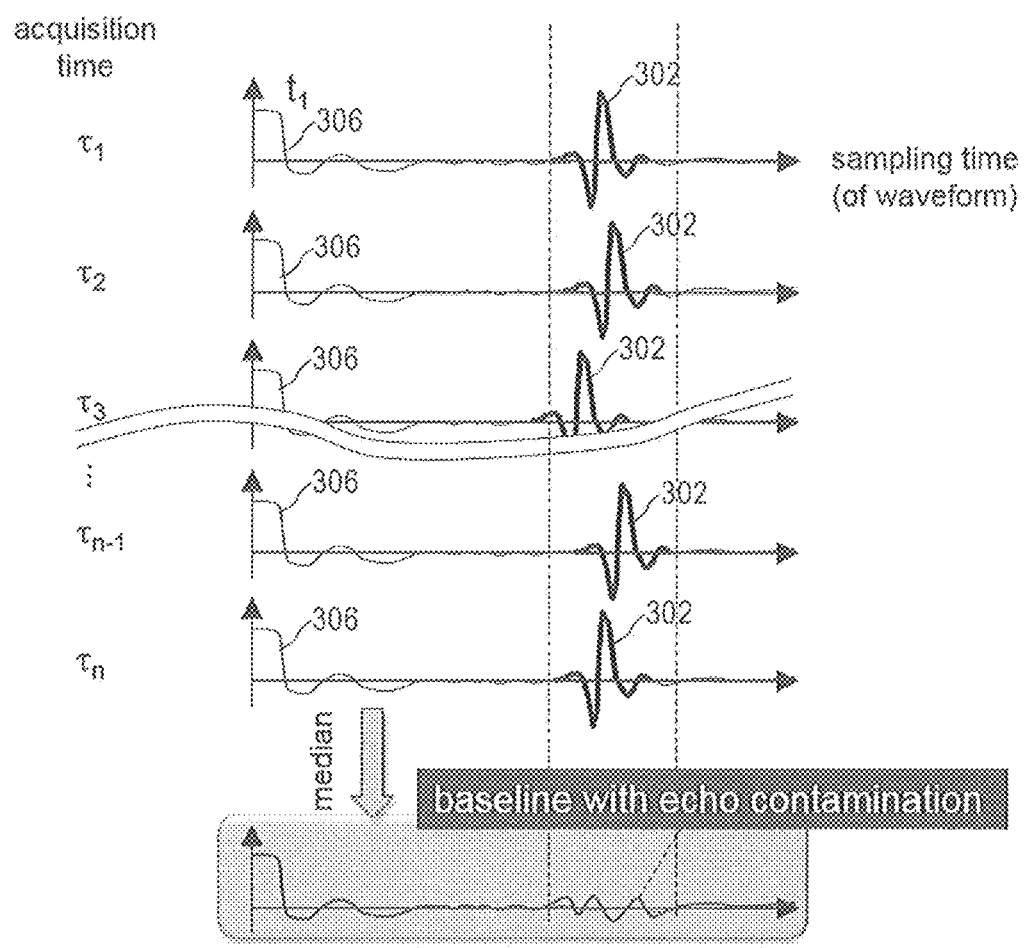
FIG. 12 illustrates a baseline estimation disallowed when the tool is centered.

The baseline may be estimated as median (not arithmetic average) of waveform data at each sampling time, t(i) over multiple acquisition time (tn) or sequences as shown in FIG. 11. The baseline estimation may be limited when the tool is centered in a borehole, because echo signals do not move along sampling time axis, so that median value can be have unexpected offset. If such case happens for more than one tool turn, the tool may be stopped for updating the baseline as shown in FIG. 12. When the tool disallows the baseline estimation process, a memorized baseline from the past may be used as a substitute baseline.

Figure 13:
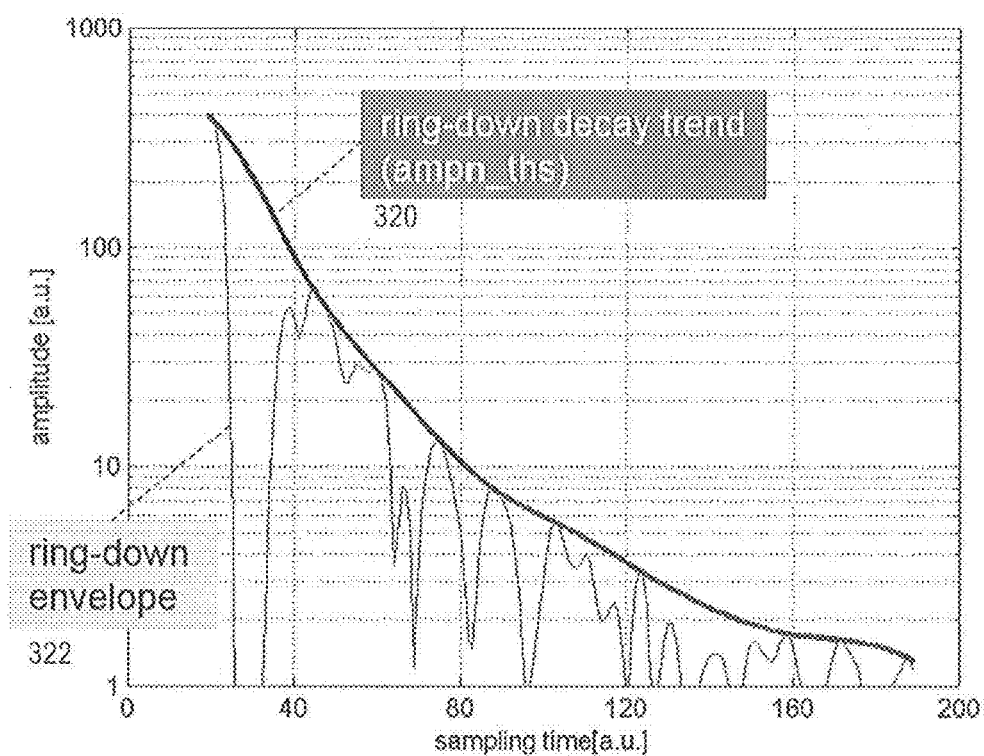
FIG. 13 illustrates one example of a ring-down decay trend for four transducers.

In some embodiments of the present disclosure, another usage of estimated baseline is to control the quality of echo detection. Although baseline removal allows successful detection of relatively small amplitude echo, however, its quality is expected to be low when the echo amplitude is smaller than ring-down amplitude, or in other words, signal-to-noise ratio is smaller than 1. From the estimated baseline, the tool may compute sampling time dependent ring-down decay trend 320 that is interpolation of prominent ring-down peaks 322 as shown in FIG. 13. The trend curves computed for four transducers may be an amplitude threshold, ampn_th (n=1, 2, 3, 4) used for quality control of transit time data.

Figure 14:
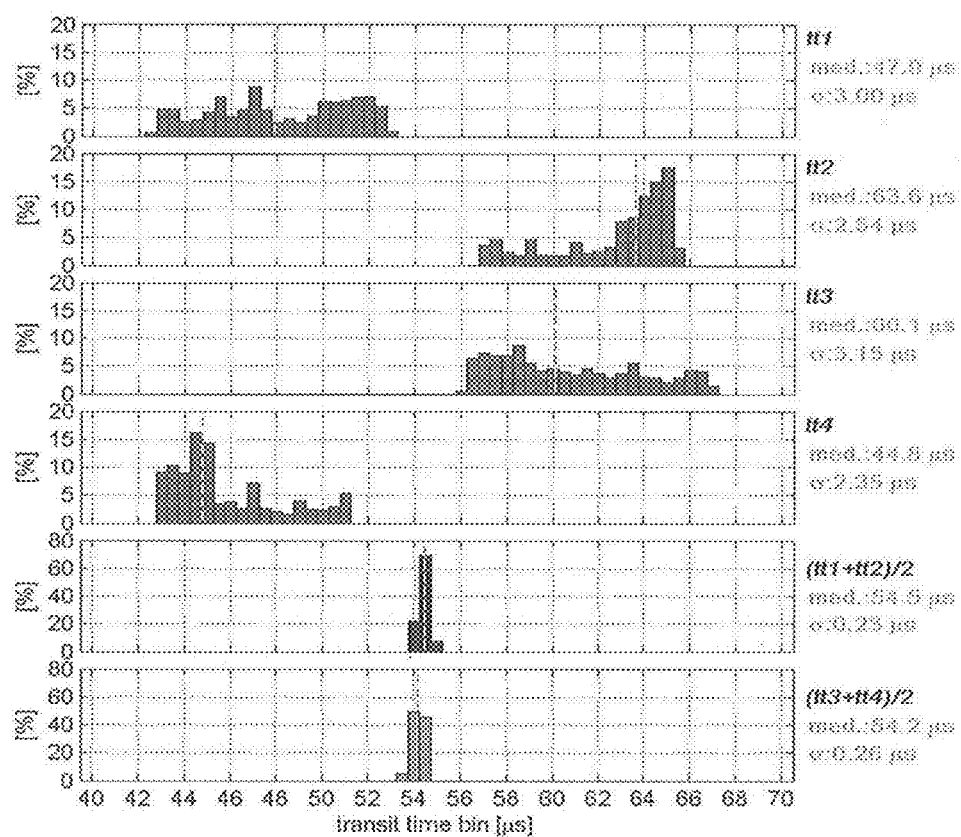
FIG. 14 shows one example of histograms of transit time data shown in FIG. 10.

FIG. 14 shows one example of histograms of transit time data shown in FIG. 10. From the top to bottom, tt1, normalized distribution of transit time data, i.e., tt2, tt3, tt4, (tt1+tt2)/2 and (tt3+tt4)/2 are presented. The horizontal and vertical axes are respectively distribution (unit: percentage) and transit time (unit: μs, 0.5 μs-bin). As the result of biased tool eccentering, distribution is also offset. The transit time of individual transducer varies (variation approximately in 10 μs) for baseline estimation, and two diametrical transit time distributions has prominent peaks near respective median values, i.e., 54.49 μs and 54.20 μs, with respective standard deviation of about 0.26 μs and 0.23 μs.

Figure 15:
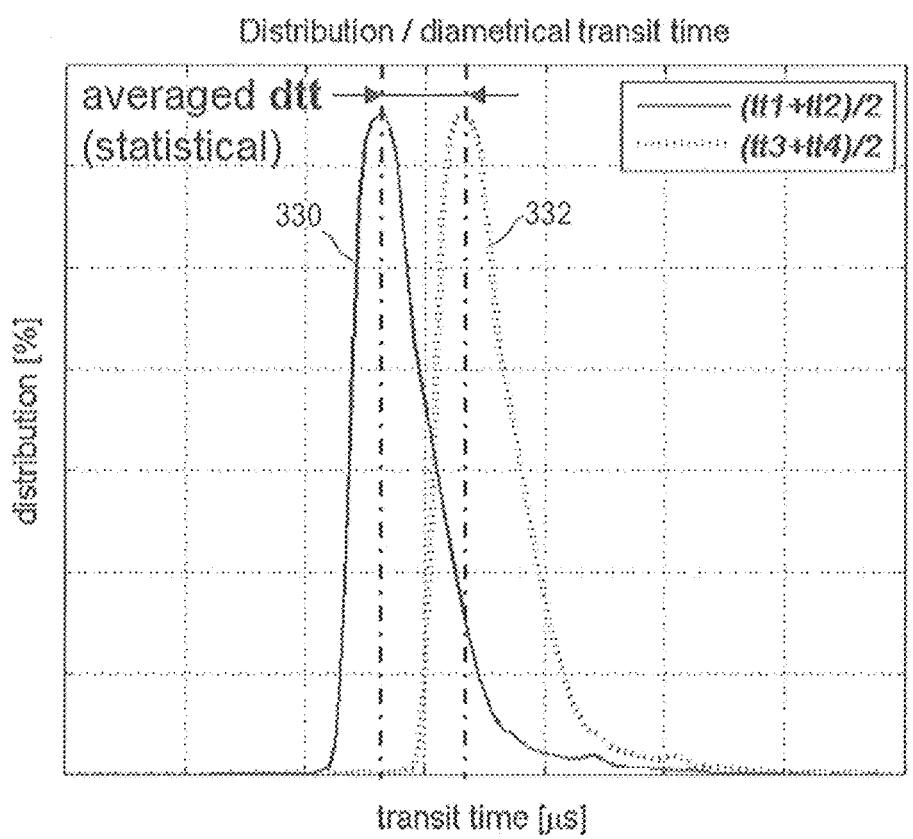
FIG. 15 shows examples of diametrical transit time distributions of the standard mounting and offset mounting of transducers according to an embodiment of the disclosure.

FIG. 15 shows examples of diametrical transit time distributions of the standard mounting and offset mounting of transducers after rejecting unreliable data. Solid line 330 shows histogram of diametrical transit time for the standard mounting transducers T1 and T2. Dashed line 332 shows histogram of diametrical transit time of the offset mounting transducers T3 and T4. Histograms of T1-T2 and T3-T4 are very similar in shape, and nicely offset. This offset is identical or very close to statistical average of dtt_tmp.

FIG. 16 shows one possible example of well fluid acoustic slowness value presentation with their quality control. In the left of FIG. 16, DTmud (mud acoustic slowness) values are presented as the function of depth. Distribution of DTmud values at each depth is color mapped and presented as a vertical line with gradation. Solid and broken lines 340, 342 respectively show median and 10%/90% cumulative distribution. Area in two broken lines 342 indicates high probability of DTmud. As shown on the right hand side of FIG. 16, histogram snapshot at the depth of XX93.33 m is presented. The median DTmud value is slightly off from histogram peak as it is the median value of multiple depths. This depth or acquisition time averaging provide stable DTmud which is less affected by absent data that is caused by, for example, severely damaged borehole.

Figure 17:
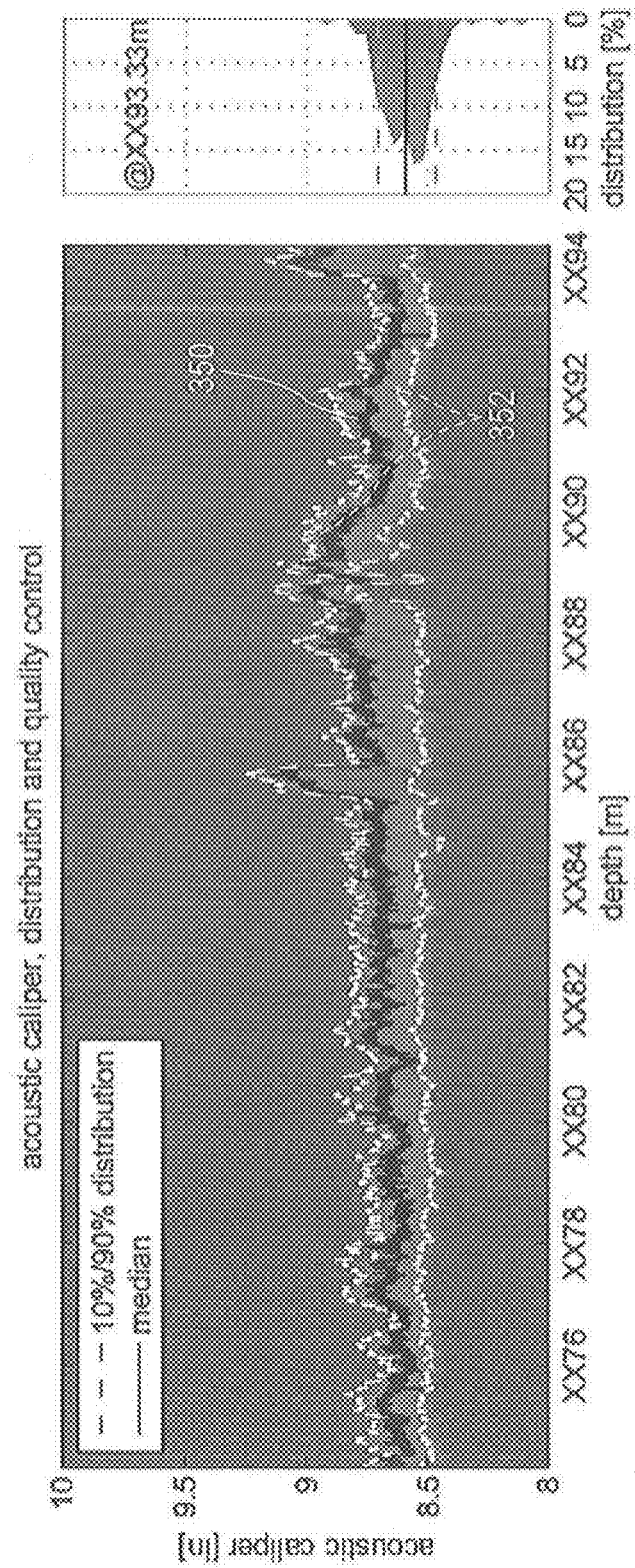
FIG. 17 shows one possible example of pulse-echo caliper value presentation with their quality control according to an embodiment of the disclosure.

FIG. 17 shows one possible example of pulse-echo caliper value presentation with their quality control. In the left of FIG. 17, caliper values are presented as the function of depth. Distribution of caliper values at each depth is color mapped and presented as a vertical line with gradation. Usually, for downhole caliper measurements, caliper readings are binned into top-of-hole (TOH) and horizontal (HOR) in a deviated hole, otherwise magnetic North-South or East-West orientations. This example is before binning caliper readings into certain orientation, however, the same presentation is also applicable to oriented caliper readings. Solid and broken lines 350, 352 respectively show median and 10%/90% cumulative distribution. The area between two dashed lines 352 indicates high probability of caliper readings at one depth. In the right of FIG. 17, histogram snapshot at the depth of XX93.33m is presented.

In some embodiments of the disclosure, mud slowness estimates of median, upper and lower borders of dtm(i), MDTM(j,i), HDTM(j,i) and LDTM(j,i), may be computed stochastically or statistically, using onlinely or using a time gather. Herein i and j is respectively time and azimuth index j. The time gather is the transit time, amplitude and azimuth data in time interval of T(I) or [tmin(I), tmax(I)]. i_start(I) and i_end(I) are respectively the minimum and maximum data index in the interval. N(I) is data index array of the time gather. I is dataset index. T(I) and N(I) may be defined by design flexibly in such a way that the gather is in constant time interval of 2 seconds, in the time that the tool makes 1 turn, or constant number samples of 10000 as an exemplary, which does not limit design in other ways. The azimuth index j is integer between 1 and J of their center angle and width defined as $\Theta(j)$ and $2 \cdot \delta\Theta(j)$. J is any even integer larger than 1, and sum of $2*\delta\Theta(j)$ over J-bin is equal to full azimuth 360 degrees. There is no azimuth binning when J is equal to 1.

The mud slowness estimates may satisfy normalized cumulative distribution function P for a set of data of its index vector X(j, I) defined as;

$$N(I) = [i\_start(I), i\_start(I)+1,\ldots, i-1, i, i+1, i+2,\ldots,i\_end(I)]$$
$$T(I) = [tmin(i), tmax(i)]$$
$$X(j, I) = \{ x \in N(I) : amp1(x) > amp1\_th(x) \ \&$$
$$amp2(x) > amp2\_th(x) \ \&$$
$$amp3(x+ioff(x)) > amp3\_th(x) \ \&$$
$$amp4(x+ioff(x)) > amp4\_th(x) \ \&$$
$$\Theta(j) - \delta\Theta(j) \leq \theta(x) < \Theta(j) + \delta\Theta(j) \ \&$$
$$\Theta(j) - \delta\Theta + 180 \leq \theta(x) < \Theta(j) + \delta\Theta + 180 \}$$
$$MDTM(j,I) : P(\ dtm\ (X(j, I)) \leq MDTM(j, I)\ ) \approx 0.5$$
$$LDTM(j,I) : P(\ dtm\ (X(j, I)) \leq LDTM(j, I)\ ) \approx qL$$
$$HDTM(j,I) : P(\ dtm\ (X(j, I)) \leq HDTM(j, I)\ ) \approx qH$$

ioff(i) is index offset that provides amp3 and amp4 data, respectively at identical azimuth bin as amp1 and amp2 data, amp1_th(i), amp2_th(i), amp3_th(i) and amp4_th(i) are amplitude thresholds for excluding outliers at time t(i), and their values can be selected either constant including 0 or time-dependently. dtm in $\Theta(j)$ and $\Theta(j)+180$ degrees are identical diametrical azimuth bin, so that j is equal or smaller than J/2. qL and qH are the arbitrary pre-set quantiles that satisfies, $0 \leq qL < 0.5$, $0.5 < qH \leq 1$.

During drilling operation, mud slowness may have little dependency on azimuth. In such a case, MDTM(j, I) may be further averaged over azimuth bin so that MDTM(j,I) has one single value in the dataset and can simplify azimuth-dependent mud slowness MDTM(j,I) as MDTM(I). MDTM (I) may be further averaged over multiple dataset.

In some embodiments of the disclosure, the instantaneous diameters from the T1-T2 and T3-T4 transducer pairs, respectively, hid12 and hid34, may be computed using median mud slowness as follows:

$$hid12(N(I))=(tt12(N(I))-\delta tt12)/2/MDTM(j,I)+r(1)+r(2)+\delta r12,$$

$$hid34(N(I))=(tt34(N(I))-\delta tt34)/2/MDTM(j,I)+r(3)+r(4)+\delta r34.$$

where, N(I) is the data array at time t(i), $\delta tt12$ and $\delta tt34$ are cumulated known time delay in diametrical transit time of transducers which is tool or transducer hardware dependent constant, for example, wave propagation time in transducer front window made of known acoustic wave propagation material.

In some embodiments of the disclosure, the three azimuthal diameters, median, upper and lower borders of hid12 and hid34 dataset, MHID(j, I), HHID(j, I) and LHID(j, I), may be computed as stochastic or statistical median, either onlinely or the time-gather defined as X(j, I). The azimuth diameter may satisfy cumulative distribution function P for a set of data of its time indices X(j, I);

X(j, I) = {x ∈ N(I) :  amp1(x)           > amp1_th(x) &
                       amp2(x)           > amp2_th(x) &
                       amp3(x+ioff(x))   > amp3_th(x) &
                       amp4(x+ioff(x))   > amp4_th(x) &
                       Θ(j)−δΘ ≤ θ(x) < Θ(j)+δΘ &
                       Θ(j)−δΘ + 180 ≤ θ(x) < Θ(j)+δΘ + 180}

MHID(j, I) : P( { hid12(X(j, I)), hid34(X(j, I)) } ≤ MHID(j, I) ) ≈ 0.5
LHID(j, I) : P( { hid12(X(j, I)), hid34(X(j, I)) } ≤ LHID(j, I) ) ≈ qL
HHID(j, I) : P( { hid12(X(j, I)), hid34(X(j, I)) } ≤ HHID(j, I) ) ≈ qH In some embodiments, a downhole tool comprises multiple acoustic transducers mounted at different positions of the tool and a control system to drive the multiple transducers, receive pressure echo signals from the transducers, record the pressure echo signals, extract data of two-way transit time and echo amplitude from the echo signals, and compute at least one of a borehole diameter, a tool center position, and an acoustic slowness or velocity of downhole fluid, based on the data of transit time and echo amplitude. In some cases, the multiple acoustic transducers are four acoustic transducers mounted at different radii r(n) and azimuthal φ(n) from an azimuth reference of the tool. A first pair of two of the acoustic transducers may be mounted at a first diameter and a second pair of other two of the acoustic transducers may be mounted at a second diameter different from the first diameter.

In the control system of an embodiment, the control system may perform the following actions, such as;

(i) makes a gather of data of the transit time (ttn(i), n=1, 2, 3, 4) and the echo amplitude (ampn(i), n=1, 2, 3, 4), azimuth orientation of a tool reference (θ(i)) and transducer mounting parameters (φ(n), δr12, δr34, and r(n), n=1, 2, 3, 4) extracted over finite time duration T(I) with series of data having indices N(I) for the transducers, where n, i and I are, respectively, transducer, time series data index and the gather index, φ(n) and r(n) are, respectively, azimuthal and radial positions of the transducers on the tool, and δr12 is sum of radial position difference or offset from r(1) and r(2) of the first transducer pair, and δr34 is radial position difference or offset from r(3) and r(4) of the second transducer pair, in some cases δr34=δr12;

(ii) inputs the gather of data together to statistic or stochastic optimization or root finding or iterative expectation-maximization process to jointly invert borehole geometry, time-varying tool positions in the borehole and mud slowness; and (iii) outputs borehole shape or azimuth dependent borehole radius (R(j), j: azimuth index), time-dependent tool center position (TP(i), i: time index), and well fluid or mud acoustic slowness DTmud(i)).

In other embodiments, a downhole tool comprises multiple acoustic transducers mounted at different positions of the tool and a control system to drive the multiple transducers, receive pressure echo signals from the transducers, record the pressure echo signals, extract data of two-way transit time and echo amplitude from the echo signals, and compute at least one of a borehole diameter, a tool center position, and an acoustic slowness or velocity of downhole fluid, based on the data of transit time and echo amplitude. In some cases, the multiple acoustic transducers are four acoustic transducers mounted at different radii r(n) and azimuthal φ(n) from an azimuth reference of the tool. A first pair of two of the acoustic transducers may be mounted at a first diameter and a second pair of other two of the acoustic transducers may be mounted at a second diameter different from the first diameter.

In this embodiment, the four acoustic transducers may be mounted at azimuthal positions oriented at 90 degrees relative to each other. The transducer mounting parameters (φ(n), δr12, δr34, and r(n), n=1, 2, 3, 4) satisfy the conditions of φ(1)=φ(2)+180 degrees, r(1)=r(2)+δr12, φ(3)=φ(4)+180 degrees=φ(1)+90 degrees=φ(4)+270 degrees, where n and i are, respectively, transducer and data indices, φ(n) is azimuthal positions of the transducers. Variable δr12 is a cumulative radial position difference from the radius r(1) and r(2) due to known tool or transducer internal structures such as diaphragm 214 or front windows or other delay lines of the first transducer pair. Variable δr34 is a cumulative radial position difference from the radius r(3) and r(4) due to known tool or transducer internal structures such as diaphragm 214 or front windows or other delay lines of the second transducer pair. And variable 'dos' is a diametrical transducer offset value. Additionally, two-way wave propagation time, respectively δtt12 and δtt34, are known The control system of this embodiment may perform the following actions, such as:

(i) recording the transit time (ttn(i), n=1, 2, 3, 4), echo amplitude (ampn(i), n=1, 2, 3, 4) using the four transducers simultaneously, with azimuth stamps θ(i) and time stamp t(i) in time series or/and azimuth referring to downhole processor time and earth magnetic field, where n and i are, respectively, transducer and data indices;

(ii) computing a first diametrical transit time that is a sum of transit time vectors of the first transducer pair, tt12(i) (=tt1(i)+tt2(i));

(iii) computing a second diametrical transit time that is a sum of transit time vectors of the second transducer pair, tt34(i) (=tt3(i)+tt4(i));

(v) computing a difference between the first diametrical transit time and the second diametrical transit time, dtt(i) =(tt34(i+ioff(i))−tt12(i))/2, wherein i is the data index and ioff(i) is i-dependent index offset so that tt12(i) and tt34(i+ioff(i)) measurements are taken at the same azimuth or in the same azimuth bin.

(v) determining a diametrical transducer offset value, dos from downhole memory;

(vi) computing a well fluid or mud acoustic slowness, dtm(i) (=dtt(i)/dos); and (vii) computing mud slowness estimates of median, upper and lower borders of dtm(N(I)), MDTM(j,I), LDTM(j,I) and HDTM(j,I), may be computed stochastic or statistic method including online, using a time gather dataset.

Herein i and j is respectively time and azimuth index j. The time gather is the transit time, amplitude and azimuth data in time interval of T(I) or [tmin(I), tmax(I)]. i_start(I) and i_end(I) are respectively the minimum and maximum data index in the interval. N(I) is data index array of the time gather. I is dataset index. T(I) and N(I) may be defined by design flexibly in such a way that the gather is in constant time interval of 2 seconds, in the time that the tool makes 1 turn, or constant number samples of 10000 as an exemplary value, which should not be limiting to the design for other values. The azimuth index j is integer between 1 and J of their center angle and width defined as Θ(j) and 2·δΘ. J is any integer equal or larger than 1 and product of 2*δΘ*J is equal to full azimuth 360 degrees. There is no azimuth binning when J is equal to 1.

The mud slowness estimates may satisfy normalized cumulative distribution function P for a set of data of its index vector X(j, I) defined as;

```
N(I) = [i_start(I), i_start(I)+1,..., i-1, i, i+1, i+2,...,i_end(I)]
T(I) = [tmin(I) tmax(I)]
X(j, I) = { x ∈N(I)  :  amp1(x)        > amp1_th(x) &
                        amp2(x)        > amp2_th(x) &
                        amp3(x+ioff(x)) > amp3_th(x) &
                        amp4(x+ioff(x)) > amp4_th(x) &
                        Θ(j) − δΘ ≤ θ(x) < Θ(j) + δΘ &
                        Θ(j) − δΘ +180 ≤ θ(x) < Θ(j) + δΘ +180}
MDTM(j,I)  :  P( dtm (X(j, I)) ≤ MDTM(j, I) ) ≈ 0.5
LDTM(j,I)  :  P( dtm (X(j, I)) ≤ LDTM(j, I) ) ≈ qL
HDTM(j,I)  :  P( dtm (X(j, I)) ≤ HDTM(j, I) ) ≈ qH
``` wherein x is subset of the dataset that falls into j-th azimuth bin. The variable ioff(x) is an index offset that provides amp3 and amp4 data, respectively at identical azimuth bin as amp1 and amp2 data, amp1_th(x), amp2_th(x), amp3_th(x) and amp4_th(x) are amplitude thresholds for excluding outliers at time t(x), and their values may be either constant or data or time dependent. The variable dtm in Θ(j) and Θ(j)+180 degrees are identical diametrical azimuth bin, so that j is equal or smaller than J/2. Variables qL and qH are the arbitrary pre-set quantiles that satisfies, 0≤qL<0.5, 0.5<qH≤1.

During drilling operation, mud slowness may have little dependency on azimuth. In such a case, MDTM(j, I) may be further averaged over azimuth bin so that MDTM(j, I) has one single value in the dataset and can simplify azimuth-dependent mud slowness MDTM(j, I) as MDTM(I), which is preferred mud slowness for the caliper computation. MDTM(I) may be further averaged over multiple datasets. MDTM is used for the caliper computation, LDTM and HDTM may be used for quality control of mud slowness measurements.

The control system may take further actions such as:
(viii) computing instantaneous diameter in time series as, $$hid12(i)=(tt12(i)-\delta tt12)/2/MDTM(j,I)+r(1)+r(2)+\delta r12,$$

$$hid34(i)=(tt34(i)-\delta tt34)/2/MDTM(j,I)+r(3)+r(4)+\delta r34; \text{ and}$$

(ix) computing, median, upper and lower borders of hid12 and hid34 dataset, MHID(j, I),
HHID(j, I) and LHID(j, I), using stochastic or statistical method including online, using time gather data defined by data index vector X(j, I) or simplified as X. The azimuth diameter may satisfy cumulative distribution function P for a set of data defined by X(j, I);

```
X(j, I) = {x ∈N(I) :   amp1(x)        > amp1_th(x) &
                       amp2(x)        > amp2_th(x) &
                       amp3(x+ioff(x)) > amp3_th(x) &
                       amp4(x+ioff(x)) > amp4_th(x) &
                       Θ(j)−δΘ ≤ θ(x) < Θ(j)+δΘ &
                       Θ(j)−δΘ+180 ≤ θ(x) < Θ(j)+δΘ+180 }
MHID(j, I)  :  P( { hid12(X(j, I)), hid34(X(j, I)) } ≤ MHID(j, I) ) ≈ 0.5
LHID(j, I)  :  P({ hid12(X(j, I)), hid34(X(j, I)) } ≤ LHID(j, I))  ≈ qL
HHID(j, I)  :  P({ hid12(X(j, I)), hid34(X(j, I)) } ≤ HHID(j, I))  ≈ qH
```

The median value, MHID is used as reliable caliper readings, and LHID and HHID may be used for quality control of the caliper measurements.

Figure 18:
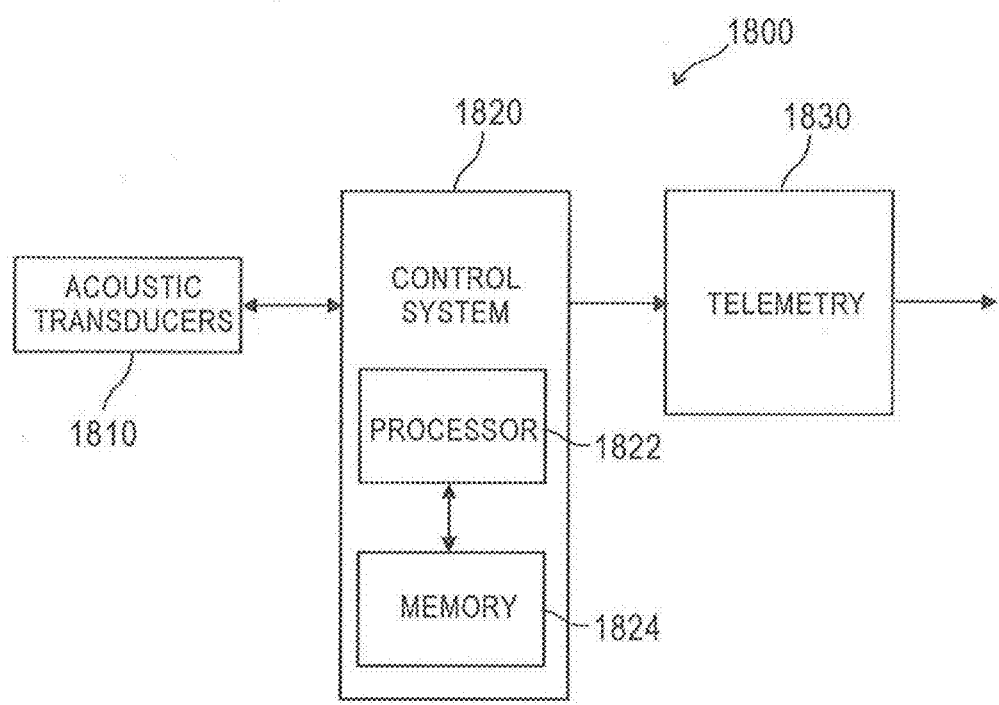
FIG. 18 illustrates one example of a system for real-time caliper measurements in a downhole tool according to an embodiment of the disclosure.

Referring to FIG. 18, the system 1800 for real-time caliper measurements may comprise multiple acoustic transducers 1810, a control system 1820 and a telemetry 1830. The acoustic transducers 1810 may be mounted in the foregoing mounting configuration as described in aforementioned embodiments. The control system 1820 may include electronics or circuitry for driving the transducers 1810 and/or detecting signals by the transducers 1810. The control system 1820 may also include a processor 1822 and a memory 1824.

By executing program codes of software and/or firmware, the processor 1822 can be used to control drive the transducers 1810, receive pressure echo signals from the transducers 1810, record the pressure echo signals in the memory 1824, extract data of two-way transit time and echo amplitude from the echo signals, and compute at least one of a borehole diameter, a tool center position, and an acoustic slowness or velocity of downhole fluid, based on the data of transit time and echo amplitude. The processor 1822 may be implemented by one or more circuit(s), programmable processor(s), application specific integrated circuit(s) (ASIC(s)), programmable logic device(s) (PLD(s)) and/or field programmable logic device(s) (FPLD(s)), etc. The data acquired or computed in the processor 1822 may be stored in the memory 1824 and transmitted to an external apparatus such as a surface apparatus by telemetry 1830 via a cable. The processor 1822 is in communication with the memory 1824 including a volatile memory and a non-volatile memory via a bus.

The volatile memory may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory may be implemented by flash memory and/or any other desired type of memory device. The memory 1824 may include a USB memory, a memory card, a magnetic tape or disk, an optical disk, etc. The pressure echo signals from the transducers acquired from the transducers 1820 are temporarily or permanently stored in the memory 1824. Software and/or firmware including instructions for controlling the transducers and processing the data for caliper measurements are also stored in the memory 1824.

Figure 19:
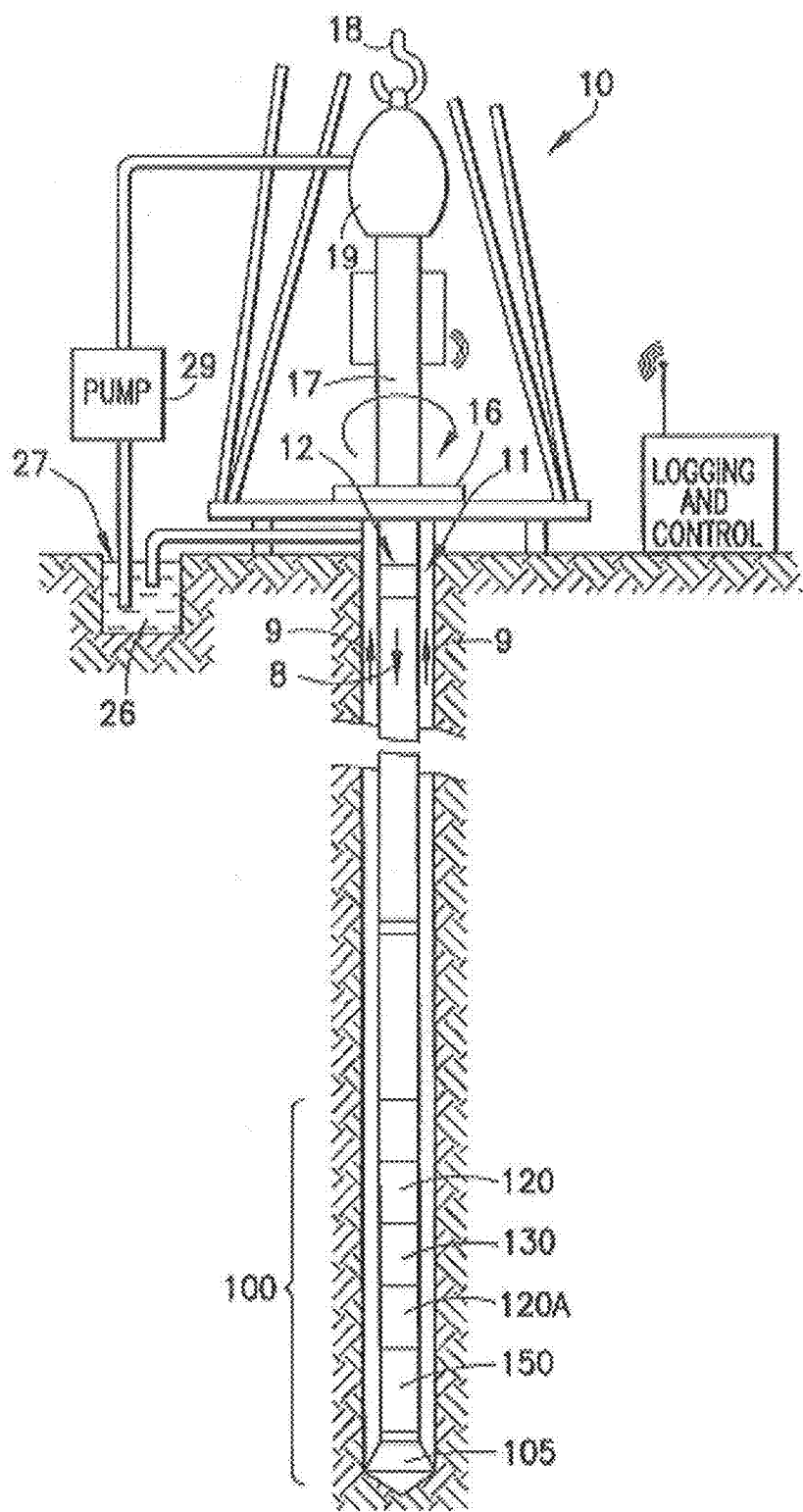
FIG. 19 is a schematic illustration of a wellsite system.

FIG. 19 illustrates a wellsite system in which the embodiments of the present disclosure can be employed. The wellsite can be onshore or offshore. The foregoing system for real-time caliper measurements with multiple acoustic transducers can be included in the LWD module (LWD tool) 120.

In this exemplary system, a borehole 11 is formed in subsurface formations by rotary drilling in a manner that is well known. Embodiments of the present disclosure can also use directional drilling.

A drill string 12 is suspended within the borehole 11 and has a bottomhole assembly (BHA) 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block, through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well-known manner, the drilling fluid lubricates the drill bit 105 and carries formation cuttings up to the surface as it is returned to the pit 27 for recirculation.

The bottomhole assembly 100 of the illustrated embodiment has a logging-while-drilling (LWD) module 120, a measuring-while-drilling (MWD) module 130, a roto-steerable system and motor 150, and drill bit 105.

The LWD module (LWD tool) 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of the LWD module 120 can alternatively mean a module at the position of 120A as well.) The LWD module 120 includes capabilities for measuring, processing, and storing information, as well as for communicating with the surface equipment. In the present embodiment, the LWD module 120 includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service. The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A downhole tool comprising:

multiple acoustic transducers mounted at different positions of the tool, wherein each acoustic transducer is operable to fire an acoustic impulse towards a borehole wall when the downhole tool is disposed in a borehole and to receive a pressure echo signal reflected on the borehole wall, wherein the multiple acoustic transducers are four acoustic transducers mounted at different radii $r(n)$ and azimuthal $\varphi(n)$ from an azimuth reference of the tool, wherein a first pair of two of the acoustic transducers is mounted at a first diameter and a second pair of other two of the acoustic transducers is mounted at a second diameter different from the first diameter; and a control system to drive the multiple transducers, receive pressure echo signals from the transducers, record the pressure echo signals, extract data of two-way transit time and echo amplitude from the echo signals, and compute at least one of a borehole diameter, a tool center position, and an acoustic slowness or velocity of downhole fluid, based on the data of transit time and echo amplitude.

2. The downhole tool according to claim 1, wherein the center of the first diameter and the center of the second diameter are located at axes different from each other.

3. The downhole tool according to 1, wherein both centers of the first diameter and the second diameter are located at one identical axis.

4. The downhole tool according to 1, wherein the first pair of acoustic transducers is located offset from the second pair of acoustic transducers along the tool axis.

5. The downhole tool according to 1, wherein the control system:

(i) makes a gather of data of the transit time ($ttn(i)$, $n=1, 2, 3, 4$) and the echo amplitude ($ampn(i)$, $n=1, 2, 3, 4$), azimuth orientation of a tool reference ($\theta(i)$) and transducer mounting parameters ($\varphi(n)$, $\delta r12$, $\delta r34$, and $r(n)$, $n=1, 2, 3, 4$) extracted over finite time duration $T(I)$ with series of data having indices N(I) for the transducers, where n, i and I are, respectively, transducer, time series data index and the gather index, φ(n) and r(n) are, respectively, azimuthal and radial positions of the transducers on the tool, and δr12 is a sum of a radial position difference or offset from r(1) and r(2) of the first transducer pair, and δr34 is a sum of a radial position difference or offset from r(3) and r(4) of the second transducer pair;

(ii) inputs the gather of data together to statistic or stochastic optimization or root finding or iterative expectation-maximization process to jointly invert borehole geometry, time-varying tool positions in the borehole and mud slowness; and (iii) outputs borehole shape or azimuth dependent borehole radius (R(j), j: azimuth index), time-dependent tool center position (TP(i), i: time index), and well fluid or mud acoustic slowness DTmud(i)).

6. The downhole tool according to 1,
wherein the four acoustic transducers are mounted at azimuthal positions oriented at 90 degrees relative to each other,
wherein transducer mounting parameters (φ(n), δr12, δr34, and r(n), n=1, 2, 3, 4) satisfies the condition of φ(1)=φ(2)+180 degrees, r(1)=r(2)+δr12, φ(3)=φ(4)+180 degrees=φ(1)+90 degrees=φ(4)+270 degrees, where n and i are, respectively, transducer and data indices, φ(n) is azimuthal positions of the transducers and δr12 is cumulative radial position difference from the radius r(1) and r(2) of the first transducer pair, δr34 is cumulative radial position difference from the radius r(3) and r(4) of the second transducer pair, and dos is a diametrical transducer offset value, and two-way wave propagation time, respectively δtt12 and δtt34, are known; and
wherein the control system:

(i) records the transit time (ttn(i), n=1, 2, 3, 4), echo amplitude (ampn(i), n=1, 2, 3, 4) using the four transducers simultaneously, with azimuth stamps θ(i) and time stamp t(i) in time series or azimuth referring to downhole processor time and earth magnetic field, where n and i are, respectively, transducer and data indices;

(ii) computes a first diametrical transit time that is a sum of transit time vectors of the first transducer pair, tt12(i) (=tt1(i)+tt2(i));

(iii) computes a second diametrical transit time that is a sum of transit time vectors of the second transducer pair, tt34(i) (=tt3(i)+tt4(i));

(v) computes a difference between the first diametrical transit time and the second diametrical transit time, dtt(i)=(tt34(i+ioff(i))−tt12(i))/2, wherein i is the data index and ioff(i) is i-dependent index offset so that tt12(i) and tt34(i+ioff(i)) measurements are taken at the same azimuth or in the same azimuth bin, (v) determines a diametrical transducer offset value, dos from downhole memory;

(vi) computes a well fluid or mud acoustic slowness, dtm(i) (=dtt(i)/dos); and (vii) computes mud slowness estimates of median, upper and lower borders of dtm(N(I)), MDTM(j,I), LDTM(j,I) and HDTM(j,I), may be computed stochastic or statistic method using a time gather dataset wherein i and j are respectively time and azimuth index j, (viii) computes instantaneous diameter in time series as, $hid12(i)=(tt12(i)−δtt12)/2/MDTM(j,I)+r(1)+r(2)+δr12$, $hid34(i)=(tt34(i)−δtt34)/2/MDTM(j,I)+r(3)+r(4)+δr34$; and (ix) computes, median, upper and lower borders of hid12 and hid34 dataset, MHID(j, I), HHID(j, I) and LHID(j, I), using stochastic or statistical method, using time gather data defined by data index vector X(j, I) or simplified as X, in which an azimuth diameter may satisfy cumulative distribution function P for a set of data defined by X(j, I);

```
X(j, I) = { x ∈N(I) :   amp1(x)         > amp1_th(x) &
                        amp2(x)         > amp2_th(x) &
                        amp3(x+ioff(x)) > amp3_th(x) &
                        amp4(x+ioff(x)) > amp4_th(x) &
                        Θ(j)−δΘ ≤ θ(x) < Θ(j)+δΘ &
                        Θ(j)−δΘ+180 ≤ θ(x) < Θ(j)+δΘ+180 };
MHID(j, I)  :  P( { hid12(X(j, I)), hid34(X(j, I)) } ≤ MHID(j, I) ) ≈ 0.5;
LHID(j, I)  :  P({ hid12(X(j, I)), hid34(X(j, I)) } ≤ LHID(j, I)) ≈ qL;
HHID(j, I)  :  P({ hid12(X(j, I)), hid34(X(j, I)) } ≤ HHID(j, I)) ≈ qH.
```

7. The downhole tool according to claim 6, wherein the mud slowness estimates may satisfy normalized cumulative distribution function P for a set of data of its index vector X(j, I) defined as;

```
N(I) = [i_start(I), i_start(I)+1,..., i−1, i, i+1, i+2,...,i_end(I)];
T(I) = [tmin(I) tmax(I)];
X(j, I) = { x ∈N(I)  :  amp1(x)         > amp1_th(x) &
                        amp2(x)         > amp2_th(x) &
                        amp3(x+ioff(x)) > amp3_th(x) &
                        amp4(x+ioff(x)) > amp4_th(x) &
                        Θ(j) − δΘ ≤ θ(x) < Θ(j) + δΘ &
                        Θ(j) − δΘ +180 ≤ θ(x) < Θ(j) + δΘ +180};
MDTM(j,I)  :  P( dtm (X(j, I)) ≤ MDTM(j, I) ) ≈ 0.5;
LDTM(j,I)  :  P( dtm (X(j, I)) ≤ LDTM(j, I) ) ≈ qL;
HDTM(j,I)  :  P( dtm (X(j, I)) ≤ HDTM(j, I) ) ≈ qH;
``` wherein x is subset of the dataset that falls into j-th azimuth bin; ioff(x) is index offset that provides amp3 and amp4 data, respectively at identical azimuth bin as amp1 and amp2 data, amp1_th(x), amp2_th(x), amp3_th(x) and amp4_th(x) are amplitude thresholds for excluding outliers at time t(x); dtm in Θ(j) and Θ(j)+180 degrees are identical diametrical azimuth bin, so that j is equal or smaller than J/2; qL and qH are arbitrary pre-set quantiles that satisfy, 0≤qL<0.5, 0.5<qH≤1.

8. The downhole tool according to claim 1, wherein the four acoustic transducers are mounted at azimuthal positions oriented at 90 degrees relative to each other.

9. The downhole tool according to 1, wherein each data of transit time and echo amplitude include time stamp and azimuth stamp.

10. The downhole tool according to 1, wherein the control system extracts the data of transit time and echo amplitude at a speed high enough to select the data into equi-spaced multiple azimuth bins referring to magnetic field of the earth using a magnetometer.

11. The downhole tool according to claim 1, wherein each of the acoustic transducers has an active acousto-electrical transducer element, and is housed in a package at a recessed position relative to a reference plane.

12. The downhole tool according to claim 1, wherein the control system performs the computation based on a measured or estimated echo break time as well as the data of transit time and echo amplitude.

13. The downhole tool according to claim 1, wherein the control system performs the computation by inputting the data of transit time and echo amplitude to an iterative optimization process, a stochastic optimization process or a root finding process.

14. The downhole tool according to claim 1, wherein the acoustic transducers are driven with a frequency in a range from 100 kHz to 700 kHz.

15. The downhole tool according to claim 1, wherein the control system applies a band-pass filter to the echo signals.

16. The downhole tool according to claim 1, further comprising a telemetry for transmitting data of the at least one of a borehole diameter, a tool center position, and an acoustic slowness or velocity of downhole fluid.

17. The downhole tool according to claim 1, wherein the downhole tool is a LWD (logging-while-drilling) tool or a wireline logging tool.

18. A method for caliper measurements in a borehole, the method comprising:
    deploying a downhole tool according to claim 1 in a borehole;
    driving the multiple transducers;
    receiving pressure echo signals from the transducers;
    recording the pressure echo signals;
    extracting data of transit time and echo amplitude from the echo signals; and
    computing at least one of a borehole diameter, a tool center position, and an acoustic slowness or velocity of downhole fluid, based on the data of transit time and echo amplitude.

19. The downhole tool according to claim 1, wherein the control system is configured to drive the multiple transducers so that the respective acoustic impulses are fired simultaneously.

* * * * *